US011928039B1

(12) United States Patent
Lu et al.

(10) Patent No.: US 11,928,039 B1
(45) Date of Patent: Mar. 12, 2024

(54) DATA-TRANSFER TEST MODE

(71) Applicant: Micron Technology, Inc., Boise, ID (US)

(72) Inventors: Yang Lu, Boise, ID (US); Kang-Yong Kim, Boise, ID (US); Mark Kalei Hadrick, Boise, ID (US); Keun Soo Song, Meridian, ID (US)

(73) Assignee: Micron Technologies, Inc., Boise, ID (US)

( * ) Notice: Subject to any disclaimer, the term of this patent is extended or adjusted under 35 U.S.C. 154(b) by 0 days.

(21) Appl. No.: 18/051,603

(22) Filed: Nov. 1, 2022

(51) Int. Cl.
*G06F 11/27* (2006.01)
*G06F 7/76* (2006.01)
*G06F 11/30* (2006.01)
*G06F 13/00* (2006.01)
*G06F 13/14* (2006.01)
*G06F 13/28* (2006.01)
*G06F 21/85* (2013.01)

(52) U.S. Cl.
CPC .............. *G06F 11/27* (2013.01); *G06F 7/762* (2013.01); *G06F 11/3041* (2013.01); *G06F 13/00* (2013.01); *G06F 13/14* (2013.01); *G06F 13/28* (2013.01); *G06F 21/85* (2013.01); *G06F 2213/00* (2013.01); *G06F 2213/0024* (2013.01)

(58) Field of Classification Search
CPC ...... G06F 11/27; G06F 7/762; G06F 11/3041; G06F 13/00; G06F 13/14; G06F 13/28; G06F 21/85; G06F 2213/00; G06F 2213/0024

USPC .................................. 714/718; 365/200, 201
See application file for complete search history.

(56) References Cited

U.S. PATENT DOCUMENTS

| 5,959,914 A | * | 9/1999 | Gates ................... | G06F 11/1048 714/E11.049 |
| 2011/0121294 A1 | * | 5/2011 | Koyama ............ | G01R 31/2644 257/E23.01 |
| 2012/0182776 A1 | * | 7/2012 | Best ...................... | G11C 11/406 365/51 |

(Continued)

OTHER PUBLICATIONS

Zhang et al., Face-to-Face Bus Design with Built-in Self-Test in 3D ICs, 2013, IEEE, pp. 1-7. (Year: 2013).*

(Continued)

*Primary Examiner* — John J Tabone, Jr.
(74) *Attorney, Agent, or Firm* — Colby Nipper PLLC

(57) ABSTRACT

Apparatuses and techniques for implementing a data-transfer test mode are described. The data-transfer test mode refers to a mode in which the transfer of data from an interface die to a linked die can be tested prior to connecting the interface die to the linked die. In particular, the data-transfer test mode enables the interface die to perform aspects of a write operation and output a portion of write data that is intended for the linked die. With the data-transfer test mode, testing (or debugging) of the interface die can be performed during an earlier stage in the manufacturing process before integrating the interface die into an interconnected die architecture. For example, this type of testing can be performed at a wafer level or at a single-die-package (SDP) level. In general, the data-transfer test mode can be executed independent of whether the interface die is connected to the linked die.

20 Claims, 18 Drawing Sheets

(56) References Cited

U.S. PATENT DOCUMENTS

| | | | | |
|---|---|---|---|---|
| 2012/0294058 | A1* | 11/2012 | Best | G11C 11/4096 |
| | | | | 365/51 |
| 2017/0012956 | A1* | 1/2017 | Lee | H04L 63/06 |
| 2020/0327084 | A1* | 10/2020 | Choudhary | G06F 12/109 |
| 2022/0399349 | A1* | 12/2022 | Okada | G11C 16/08 |
| 2023/0051863 | A1* | 2/2023 | Hush | H01L 25/18 |
| 2023/0386543 | A1* | 11/2023 | Tran | G06F 11/1044 |

OTHER PUBLICATIONS

Gupta et al., Low Power, Light Weight and Transparent Multi-Chip Communication Link for IoT Segment, 2021, IEEE, pp. 1-6 (Year: 2021).*

* cited by examiner es. RAM can include static
DATA-TRANSFER TEST MODE

BACKGROUND

A processor executes code based on data to run applications and provide features to a user. The processor obtains the code and the data from a memory that can store information. Thus, like a processor's speed or number of cores, a memory's characteristics can impact the performance of an electronic device. Different types of memory have different characteristics. Memory types include volatile memory and nonvolatile memory, such as random access memory (RAM) and flash memory, respectively. RAM can include static RAM (SRAM) and dynamic RAM (DRAM).

Demands on the different types of memory continue to evolve and grow. For example, as processors are engineered to execute code faster, such processors can benefit from accessing memories more quickly. Applications may also operate on ever-larger data sets that use ever-larger memories. Due to battery-powered electronic devices and power-hungry data centers, energy-usage constraints are becoming more prevalent for memory systems. Further, manufacturers may seek smaller memories as the form factors of portable electronic device continue to shrink. Accommodating these various demands is thus complicated by the diverse strengths and capabilities of different types of memories.

BRIEF DESCRIPTION OF THE DRAWINGS

Apparatuses of and techniques for implementing a data-transfer test mode are described with reference to the following drawings. The same numbers are used throughout the drawings to reference like features and components:

FIG. 8-1 illustrates an example interface die performing aspects of a write operation in accordance with an interconnected mode;

FIG. 8-2 illustrates an example linked die performing aspects of a write operation in accordance with an interconnected mode;

FIG. 9-1 illustrates an example interface die performing aspects of a read operation in accordance with an interconnected mode;

FIG. 9-2 illustrates an example linked die performing aspects of a read operation in accordance with an interconnected mode;

FIG. 13-1 illustrates an example output order in accordance with a data-transfer test mode;

FIG. 13-2 illustrates another example output order in accordance with a data-transfer test mode;

DETAILED DESCRIPTION

Overview

Figure 1:
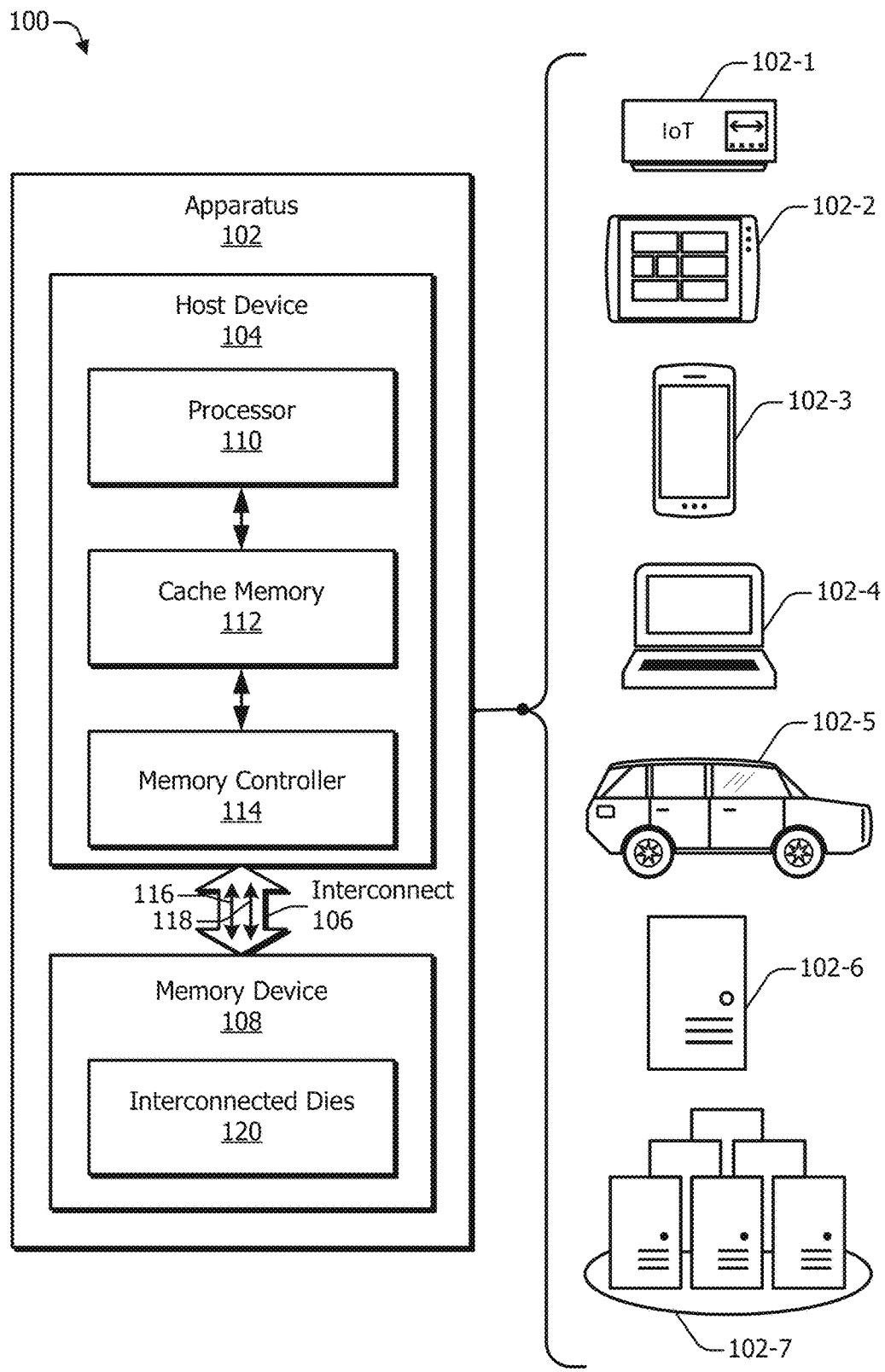
FIG. 1 illustrates an example operating environment including apparatuses that can implement aspects of a data-transfer test mode.

Computers, smartphones, and other electronic devices operate using processors and memories to run a variety of programs and applications, ranging from low-power operating systems and background utilities to computationally intensive applications for high-resolution graphics, computer simulations, artificial intelligence (AI), and so forth. Execution speeds associated with these programs and applications are often related to the performance of a memory of the electronic device, which is contingent, in part, on any delays associated with memory transfer.

A memory device may have an interconnected die architecture (e.g., a stacked or linked die architecture). This architecture uses at least one set of interconnected dies (or at least one set of interconnected dice), such as at least one interface die that is connected to at least one linked die within a combined package. The interface die can directly send data to or receive data from a memory controller. In contrast, the linked die indirectly sends data to or receives data from the memory controller through the interface die. Explained another way, the interface die acts as an interface and passes data between the linked die and the memory controller. The interface and linked dies may share joint access to an address bus. The interconnected die architecture can be relatively lower cost and/or occupy a smaller volume compared to other architectures with multiple dies.

The interface and linked dies are designed to operate together. Although the interface and linked dies can undergo testing and debugging once connected together, identifying problems at this stage can be costly. It would be beneficial to be able to test and debug aspects of the interconnected dies at earlier stages in the manufacturing process (e.g., prior to integration within the interconnected die architecture).

To address this and other issues regarding an interconnected die architecture, this document describes aspects of a data-transfer test mode. The data-transfer test mode refers to a mode in which the transfer of data from an interface die to a linked die can be tested prior to connecting the interface die to the linked die. In particular, the data-transfer test mode enables the interface die to perform aspects of a write operation and output a portion of write data that is intended for the linked die. With the data-transfer test mode, testing (or debugging) of the interface die can be performed during an earlier stage in the manufacturing process before integrating the interface die into an interconnected die architecture. For example, this type of testing can be performed at a wafer level or at a single-die-package (SDP) level. In general, the data-transfer test mode can be executed independent of whether the interface die is connected to the linked die.

In some cases, the apparatuses and methods that are described herein may be appropriate for memory that is designed for lower power operations or that is targeted for energy-efficient applications. Thus, the described principles may be incorporated into a low-power memory device or a memory controller that communicates with such a low-power memory device. An example of a memory standard that relates to low-power applications is the Low-Power Double Data Rate (LPDDR) standard for synchronous DRAM (SDRAM) as promulgated by the Joint Electron Device Engineering Council (JEDEC) Solid State Technology Association. Some terminology in this document may draw from one or more of these standards or versions thereof, like the LPDDR5 standard, for clarity. The described principles, however, are also applicable to memories that comport with other standards, including other LPDDR standards (e.g., earlier versions or future versions like LPDDR6), and to memories that do not adhere to a public standard.

The density of memory devices continues to increase to maximize available memory and circuit area because improved communication protocols allow for higher rates of data transfer between processors and memory devices. An example of such an improved protocol is the Compute Express Link™ (CXL™) protocol or standard (referred to hereinafter as "the CXL protocol" or "the CXL standard"). The CXL protocol can be implemented over a physical layer that is governed by, for instance, the PCIe ° (Peripheral Component Interconnect Express) protocol. The CXL protocol targets intensive workloads for processors and memory devices (e.g., accelerators, memory expanders), where efficient, coherent memory access or interactions between processors and memory is advantageous.

The CXL protocol addresses some of the limitations of PCIe links by providing an interface that leverages, for example, the PCIe 5.0 physical layer and electricals, while providing lower-latency paths for memory access and coherent caching between processors and memory devices. It offers high-bandwidth, low-latency connectivity between host devices (e.g., processors, central processing units (CPUs), system-on-chips (SoCs)) and memory devices (e.g., accelerators, memory expanders, memory buffers, smart input/output (I/O) devices). The CXL protocol also addresses growing high-performance computational workloads by supporting heterogeneous processing and memory systems with potential applications in artificial intelligence, machine learning, communication systems, and other high-performance computing.

A data-transfer test mode may be used in CXL implementations. An example implementation, for instance, can include a memory device with multiple memory controllers and/or one or more sets of interconnected dies. Each set of interconnected dies includes at least one interface die that is connected to at least one linked die via an interconnect. The interface die can directly send data to or receive data from a memory controller. In contrast, the linked die indirectly sends data to or receives data from the memory controller through the interface die and the interconnect. Explained another way, the interface die acts as an interface and transfers data between the linked die and the memory controller.

In aspects, a data-transfer test mode may be used to test the interface die in situations where high-density memory is used, for example in CXL implementations. However, the data-transfer test mode may be implemented in various other types of memory devices with interconnected dies to facilitate testing prior to integration.

Example Operating Environments

FIG. 1 illustrates, at 100 generally, an example operating environment including an apparatus 102 that can implement a data-transfer test mode. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure, a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit, graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a double-data-rate (DDR) memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. The memory controller 114 can, for example, receive memory requests from the processor 110 and provide the memory requests to external memory with appropriate formatting, timing, and reordering. The memory controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus, switching fabric, or one or more wires that carry voltage or current signals.

In some implementations, the interconnect 106 can include at least one command and address bus 116 (CA bus 116) and at least one data bus 118 (DQ bus 118). Each bus may be a unidirectional or a bidirectional bus. The CA bus 116 and the DQ bus 118 may couple to command-and-address (CA) and data (DQ) pins, respectively, of the memory device 108. The interconnect 106 may also include a chip-select (CS) I/O or line (not illustrated in FIG. 1) that can, for example, couple to one or more CS pins of the memory device 108. The interconnect 106 may further include a clock bus (CK bus—not illustrated in FIG. 1) that is part of or separate from the CA bus 122.

In other implementations, the interconnect 106 can be realized as a CXL link. In other words, the interconnect 106 can comport with at least one CXL standard or protocol. The CXL link can provide an interface on top of the physical layer and electricals of a PCIe 5.0 physical layer. The CXL link can cause requests to and responses from the memory device 108 to be packaged as flits. An example implementation of the apparatus 102 with a CXL link is discussed in greater detail with respect to FIG. 4. In still other implementations, the interconnect 106 can be another type of link, including a PCIe 5.0 link. In this document, some terminology may draw from one or more of these standards or versions thereof, like the CXL standard, for clarity. The described principles, however, are also applicable to memories and systems that comport with other standards and types of interconnects.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a printed circuit board (e.g., a rigid or flexible motherboard). The host device 104 and the memory device 108 may additionally be integrated together on an integrated circuit or fabricated on separate integrated circuits and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 1 an example computing system architecture having at least one host device 104 coupled to a memory device 108.

Two or more memory components (e.g., modules, dies, banks, or bank groups) can share the electrical paths or couplings of the interconnect 106. In some implementations, the CA bus 116 transmits addresses and commands from the memory controller 114 of the host device 104 to the memory device 108, which may exclude propagation of data. The DQ bus 118 can propagate data between the memory controller 114 and the memory device 108. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or a system-on-chip of the apparatus 102. In some implementations, and as discussed in greater detail with respect to FIG. 3, at least a portion of the memory device 108 has an interconnected die architecture (e.g., a stacked die architecture or linked die architecture) with at least two interconnected dies 120. The interconnected die architecture enables the memory device 108 to use two or more interconnected dies 120 for a single write or read access along a shared data path, which can be controlled or managed by a die of the interconnected dies 120.

The interconnected dies 120 operate jointly to handle write and read requests issued by the memory controller 114 or another memory controller within the memory device 108, depending on implementation. One of the interconnected dies 120 (e.g., the interface die) can also handle a write request issued as part of the data-transfer test mode through a mode register or a test mode as further described with respect to FIG. 3. Additionally, aspects of the interconnected dies 120 are described with respect to FIGS. 5 and 6. The memory device 108 is further described with respect to FIG. 2.

Figure 2:
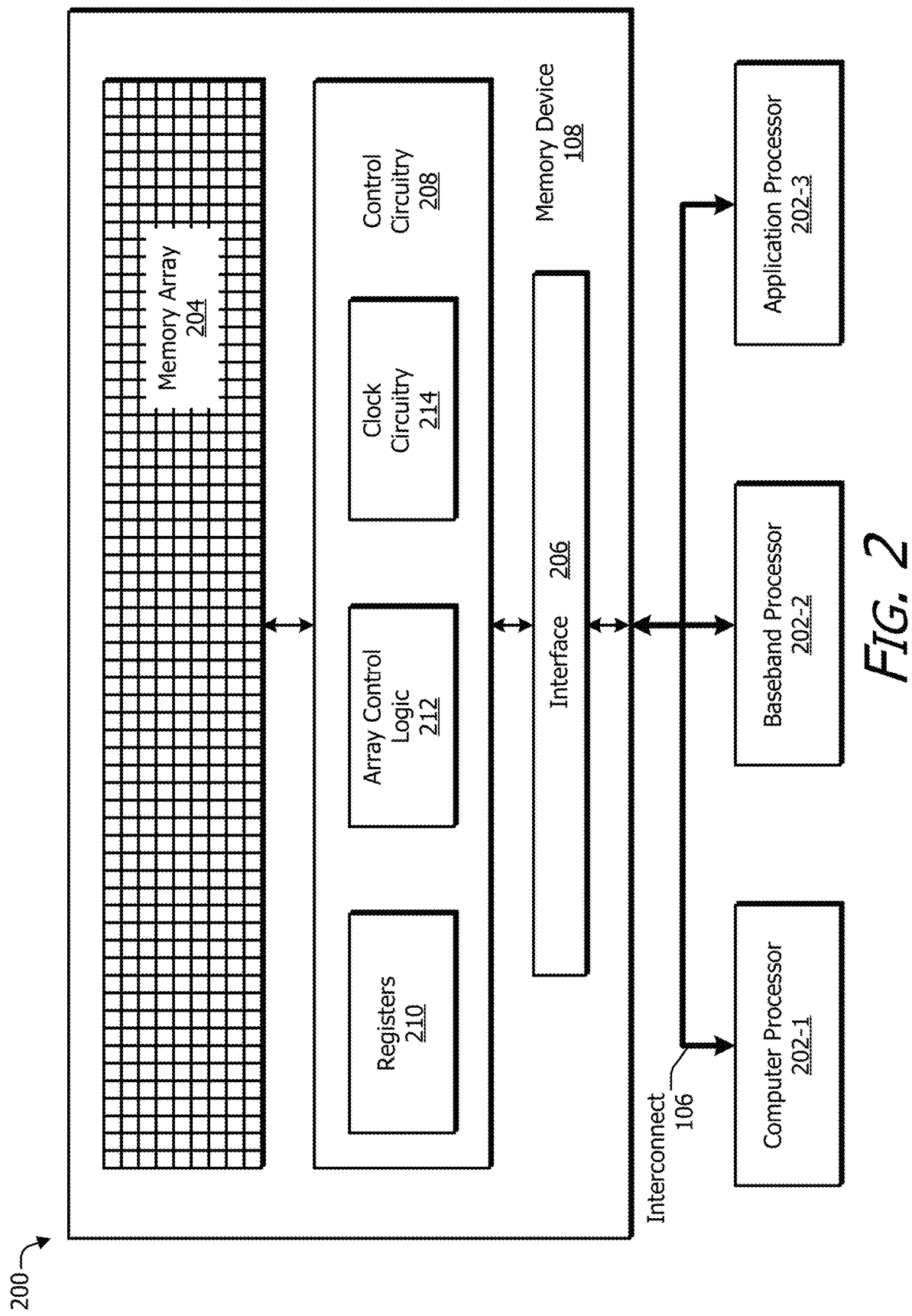
FIG. 2 illustrates an example computing system that can implement aspects of a data-transfer test mode.

FIG. 2 illustrates an example computing system 200 that can implement aspects of a data-transfer test mode. In some implementations, the computing system 200 includes at least one memory device 108, at least one interconnect 106, and at least one processor 202.

The memory device 108 can include, or be associated with, at least one memory array 204, at least one interface 206, and control circuitry 208 operatively coupled to the memory array 204. The memory device 108 can correspond to one or more of the cache memory, the main memory, or a storage memory of the apparatus 102 of FIG. 1. Thus, the memory array 204 can include an array of memory cells, including but not limited to memory cells of DRAM, SDRAM, 3D-stacked DRAM, DDR memory, low-power DRAM, or LPDDR SDRAM. For example, the memory array 204 can include memory cells of SDRAM configured as a memory module with one channel containing either 16 or 8 data (DQ) signals, double-data-rate input/output (I/O) signaling, and supporting a supply voltage of 0.3 to 0.5V. The density of the memory device 108 can range, for instance, from 2 Gb to 32 Gb.

The memory array 204 and the control circuitry 208 may be components on a single semiconductor die or on separate semiconductor dies. The memory array 204 or the control circuitry 208 may also be distributed across multiple dies, such as the interconnected dies 120. Although not explicitly shown in FIG. 2, the control circuitry 208 may include circuitry enabling one interconnected die to communicate with another interconnected die. This control circuitry may manage traffic on a bus that is separate from the interconnect 106.

The control circuitry 208 can include various components that the memory device 108 can use to perform various operations. These operations can include communicating with other devices, managing memory performance, performing refresh operations (e.g., self-refresh operations or auto-refresh operations), and performing memory read or write operations. For example, the control circuitry 208 can include one or more registers 210, at least one instance of array control logic 212, and clock circuitry 214. The registers 210 may be implemented, for example, as one or more registers that can store information to be used by the control circuitry 208 or another part of the memory device 108. At least one of the registers 210 can include a mode register. The array control logic 212 can include circuitry that provides command decoding, address decoding, input/output functions, amplification circuitry, power supply management, power control modes, and other functions. The clock circuitry 214 can synchronize various memory components with one or more external clock signals provided over the interconnect 106, including a command-and-address clock or a data clock. The clock circuitry 214 can also use an internal clock signal to synchronize memory components and may provide timer functionality.

The interface 206 can couple the control circuitry 208 or the memory array 204 directly or indirectly to the interconnect 106. As shown in FIG. 2, the registers 210, the array control logic 212, and the clock circuitry 214 can be part of a single component (e.g., the control circuitry 208). In other implementations, one or more of the registers 210, the array control logic 212, or the clock circuitry 214 may be separate components on a single semiconductor die or distributed across multiple semiconductor dies. These components may individually or jointly couple to the interconnect 106 via the interface 206.

The interconnect 106 may use one or more of a variety of interconnects that communicatively couple together various components and enable commands, addresses, or other information and data to be transferred between two or more components (e.g., between the memory device 108 and the processor 202). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a CA bus 116 and a DQ bus 118 (as illustrated in FIG. 1). As discussed above with respect to FIG. 1, the interconnect 106 can include a CXL link or comport with at least one CXL standard. The CXL link can provide an interface or overlay on top of the physical layer and electricals of the PCIe 5.0 physical layer.

In some aspects, the memory device 108 may be a "separate" component relative to the host device 104 (of FIG. 1) or any of the processors 202. The separate components can include a printed circuit board, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 202, by being combined on a printed circuit board or in a single package or a system-on-chip.

As shown in FIG. 2, the processors 202 may include a computer processor 202-1, a baseband processor 202-2, and an application processor 202-3, coupled to the memory device 108 through the interconnect 106. The processors 202 may include or form a part of a central processing unit, graphics processing unit, system-on-chip, application-specific integrated circuit, or field-programmable gate array. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, WiFi®, Bluetooth®, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices). Further, the processor 202 may be realized as one that can communicate over a CXL-compatible interconnect. Accordingly, a respective processor 202 can include or be associated with a respective link controller, like the link controller 402 illustrated in FIG. 4. Alternatively, two or more processors 202 may access the memory device 108 using a shared link controller 402. In some of such cases, the memory device 108 may be implemented as a CXL-compatible memory device (e.g., as a CXL Type 3 memory expander) or another memory device that is compatible with a CXL protocol may also or instead be coupled to the interconnect 106.

Example Techniques and Hardware

Figure 3:
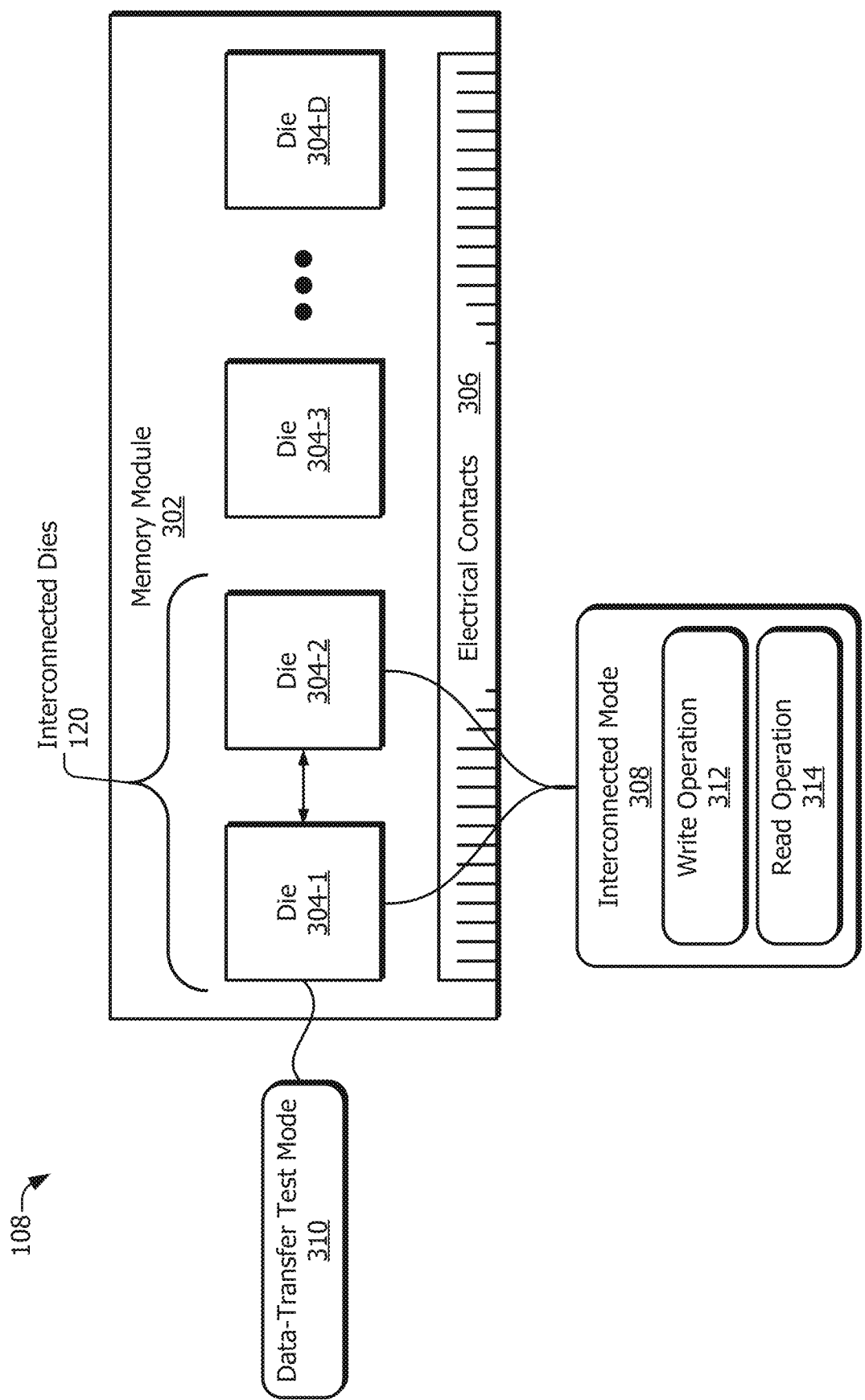
FIG. 3 illustrates an example memory device in which a data-transfer test mode can be implemented.

FIG. 3 illustrates an example memory device 108 in which a data-transfer test mode can be implemented. An example memory module 302 includes multiple dies 304. As illustrated, the memory module 302 includes a first die 304-1, a second die 304-2, a third die 304-3, and a Dth die 304-D, with D representing a positive integer. Two or more of the dies 304-1 to 304-D can be implemented as interconnected dies 120. For example, the dies 304-1 and 304-2 can be interconnected dies 120. In some cases, the memory module 302 includes multiple sets of interconnected dies 120, such as multiple pairs of interconnected dies 120, or includes a set of interconnected dies 120 that has four or more dies.

As a few examples, the memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to multiple dies (or dice) 304-1 through 304-D, or a memory module 302 with two or more dies 304. As shown, the memory module 302 can include one or more electrical contacts 306 (e.g., pins) to interface the memory module 302 to other components.

The memory module 302 can be implemented in various manners. For example, the memory module 302 may include a printed circuit board, and the multiple dies 304-1 through 304-D may be mounted or otherwise attached to the printed circuit board. The dies 304 (e.g., memory dies) may be arranged in a line or along two or more dimensions (e.g., forming a grid or array). The dies 304 may have a similar size or may have different sizes. Each die 304 may be similar to another die 304 or different in size, shape, data capacity, or control circuitries. The dies 304 may also be positioned on a single side or on multiple sides of the memory module 302. In some cases, the memory module 302 may be part of a CXL memory system or module.

Each die 304 within the interconnected dies 120 can selectively operate according to an interconnected mode 308 (e.g., a normal operational mode or a mission mode). At least some of the dies 304 can selectively operate according to a data-transfer test mode 310 (e.g., a type of isolated test mode). During the interconnected mode 308, the die 304 can jointly operate with the other die to perform a write operation 312 and/or a read operation 314. During the write operation 312, the two dies 304 write different chunks (or portions) of a burst of write data, as further described with respect to FIGS. 8-1 and 8-2. During the read operation 314, the two dies 304 read different chunks (or portions) of a burst of read data, as further described with respect to FIGS. 9-1 and 9-2. For the interconnected mode 308, the die 304 is configured as an interface die or a linked die, which are further described with respect to FIG. 5. In general, the die 304 can execute the interconnected mode 308 once the die 304 is integrated within the interconnected die architecture (e.g., while the die 304 is connected to another die of the interconnected dies 120).

During the data-transfer test mode 310, the die 304 is configured as an interface die and can operate independent of another die within the interconnected dies 120. In some cases, the die 304 may be meant to operate as an interface die within the linked die architecture (e.g., for the interconnected mode 308). The data-transfer test mode 310 evaluates aspects of the write operation 312 that involve the preparation and transfer of a portion of write data for another interconnected die 120 (e.g., for a linked die). In particular, during the data-transfer test mode 310, the die 304 can pass a first chunk of the burst of write data to its pads and can optionally write a second chunk of a burst of write data to its memory array 204, as further described with respect to FIG. 11. The data-transfer test mode 310 supports testing of the die 304 prior to integration within the interconnected dies 120. In general, however, the die 304 can execute the data-transfer test mode 310 regardless of whether the die 304 is connected to another die of the interconnected dies 120.

Figure 4:
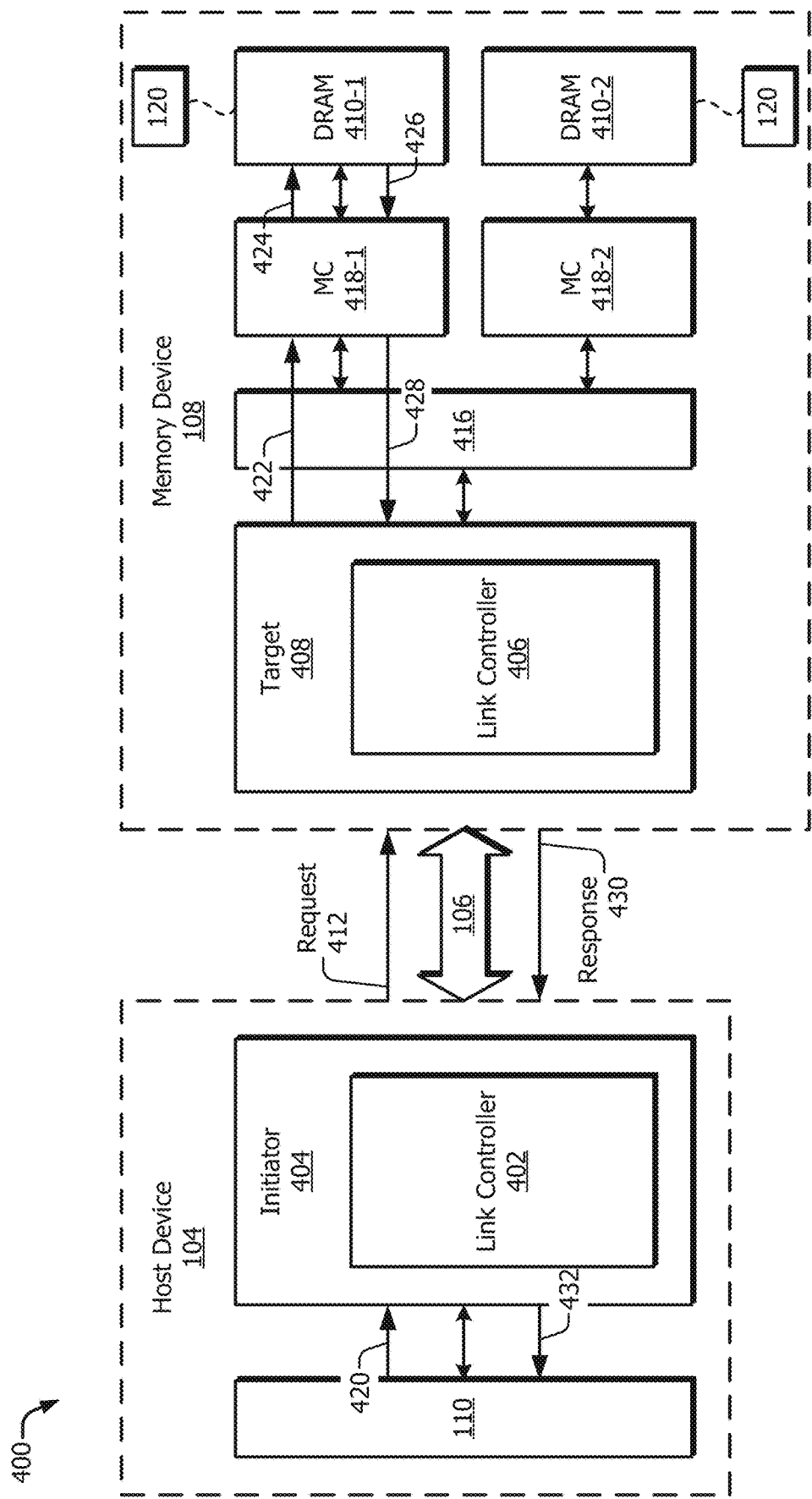
FIG. 4 illustrates an example of a system that includes a host device and a memory device coupled together via an interconnect in which a data-transfer test mode may be implemented within the memory device.

FIG. 4 illustrates an example of a system 400 that includes a host device 104 and a memory device 108 that are coupled together via an interconnect 106. The system 400 may form at least part of an apparatus 102 as shown in FIG. 1. As illustrated, the host device 104 includes a processor 110 and a link controller 402, which can be realized with at least one initiator 404. Thus, the initiator 404 can be coupled to the processor 110 or to the interconnect 106 (including to both), and the initiator 404 can be coupled between the processor 110 and the interconnect 106. Examples of initiators 404 may include a leader, a primary, a master, a main component, and so forth.

In the illustrated example system 400, the memory device 108 includes a link controller 406, which may be realized with at least one target 408. The target 408 can be coupled to the interconnect 106. Thus, the target 408 and the initiator 404 can be coupled to each other via the interconnect 106. Example targets 408 may include a follower, a secondary, a slave, a responding component, and so forth. The memory device 108 also includes a memory, which may be realized with at least one memory module 302 or other component, such as a DRAM 410, as is described further below.

In example implementations, the initiator 404 includes the link controller 402, and the target 408 includes the link controller 406. The link controller 402 or the link controller 406 can instigate, coordinate, cause, or otherwise control signaling across a physical or logical link realized by the interconnect 106 in accordance with one or more protocols. The link controller 402 may be coupled to the interconnect 106. The link controller 406 may also be coupled to the interconnect 106. Thus, the link controller 402 can be coupled to the link controller 406 via the interconnect 106. Each link controller 402 or 406 may, for instance, control communications over the interconnect 106 at a link layer or at one or more other layers of a given protocol. Communication signaling may include, for example, a request 412 (e.g., a write request or a read request), a response 414 (e.g., a write response or a read response), and so forth.

The memory device 108 may further include at least one interconnect 416 and at least one memory controller 418 (e.g., MC 418-1 and MC 418-2). Within the memory device 108, and relative to the target 408, the interconnect 416, the memory controller 418, and/or the DRAM 410 (or other memory component) may be referred to as a "backend" component of the memory device 108. In some cases, the interconnect 416 is internal to the memory device 108 and may operate in a manner the same as or different from the interconnect 106.

As shown, the memory device 108 may include multiple memory controllers 418-1 and 418-2 and/or multiple DRAMs 410-1 and 410-2. Although two each are shown, the memory device 108 may include one or more memory controllers 418 and/or one or more DRAMs 410. For example, a memory device 108 may include four memory controllers 418 and sixteen DRAMs 410, such as four DRAMs 410 per memory controller 418. The memory components of the memory device 108 are depicted as DRAM 410 only as an example, for one or more of the memory components may be implemented as another type of memory. For instance, the memory components may include nonvolatile memory like flash or phase-change memory. Alternatively, the memory components may include other types of volatile memory like static random-access memory (SRAM). A memory device 108 may also include any combination of memory types. In example implementations, the DRAM 410-1 and/or the DRAM 410-2 include interconnected dies 120.

In some cases, the memory device 108 may include the target 408, the interconnect 416, the at least one memory controller 418, and the at least one DRAM 410 within a single housing or other enclosure. The enclosure, however, may be omitted or may be merged with an enclosure for the host device 104, the system 400, or an apparatus 102 (of FIG. 1). The interconnect 416 can be disposed on a printed circuit board. Each of the target 408, the memory controller 418, and the DRAM 410 may be fabricated on at least one integrated circuit and packaged together or separately. The packaged integrated circuits may be secured to or otherwise supported by the printed circuit board and may be directly or indirectly coupled to the interconnect 416. In other cases, the target 408, the interconnect 416, and the one or more memory controllers 418 may be integrated together into one integrated circuit. In some of such cases, this integrated circuit may be coupled to a printed circuit board, and one or more modules for the memory components (e.g., for the DRAM 410) may also be coupled to the same printed circuit board, which can form a CXL type of memory device 108. This memory device 108 may be enclosed within a housing or may include such a housing. The components of the memory device 108 may, however, be fabricated, packaged, combined, and/or housed in other manners.

As illustrated in FIG. 4, the target 408, including the link controller 406 thereof, can be coupled to the interconnect 416. Each memory controller 418 of the multiple memory controllers 418-1 and 418-2 can also be coupled to the interconnect 416. Accordingly, the target 408 and each memory controller 418 of the multiple memory controllers 418-1 and 418-2 can communicate with each other via the interconnect 416. Each memory controller 418 is coupled to at least one DRAM 410. As shown, each respective memory controller 418 of the multiple memory controllers 418-1 and 418-2 is coupled to at least one respective DRAM 410 of the multiple DRAMs 410-1 and 410-2. Each memory controller 418 of the multiple memory controllers 418-1 and 418-2 may, however, be coupled to a respective set of multiple DRAMs 410 (e.g., five DRAMs 410) or other memory components.

Each memory controller 418 can access at least one DRAM 410 by implementing one or more memory access protocols to facilitate reading or writing data based on at least one memory address. The memory controller 418 can increase bandwidth or reduce latency for the memory accessing based on the memory type or organization of the memory components, like the DRAMs 410. The multiple memory controllers 418-1 and 418-2 and the multiple DRAMs 410-1 and 410-2 can be organized in many different manners. For example, each memory controller 418 can realize one or more memory channels for accessing the DRAMs 410. Further, the DRAMs 410 can be manufactured to include one or more ranks, such as a single-rank or a dual-rank memory module. Each DRAM 410 (e.g., at least one DRAM IC chip) may also include multiple banks, such as 8 or 16 banks.

This document now describes examples of the host device 104 accessing the memory device 108. The examples are described in terms of a general access which may include a memory read access (e.g., a retrieval operation) or a memory write access (e.g., a storage operation). The processor 110 can provide a memory access request 420 to the initiator 404. The memory access request 420 may be propagated over a bus or other interconnect that is internal to the host device 104. This memory access request 420 may be or may include a read request or a write request. The initiator 404, such as the link controller 402 thereof, can reformulate the memory access request 420 into a format that is suitable for the interconnect 106. This formulation may be performed based on a physical protocol or a logical protocol (including both) applicable to the interconnect 106. Examples of such protocols are described below.

The initiator 404 can thus prepare a request 412 and transmit the request 412 over the interconnect 106 to the target 408. The target 408 receives the request 412 from the initiator 404 via the interconnect 106. The target 408, including the link controller 406 thereof, can process the request 412 to determine (e.g., extract or decode) the memory access request 420. Based on the determined memory access request 420, the target 408 can forward a memory request 422 over the interconnect 416 to a memory controller 418, which is the first memory controller 418-1 in this example. For other memory accesses, the targeted data may be accessed with the second DRAM 410-2 through the second memory controller 418-2.

The first memory controller 418-1 can prepare a memory command 424 based on the memory request 422. The first memory controller 418-1 can provide the memory command 424 to the first DRAM 410-1 over an interface or interconnect appropriate for the type of DRAM or other memory component. The first DRAM 410-1 receives the memory command 424 from the first memory controller 418-1 and can perform the corresponding memory operation. The memory command 424, and corresponding memory operation, may pertain to a read operation, a write operation, a refresh operation, and so forth. Based on the results of the memory operation, the first DRAM 410-1 can generate a memory response 426. If the memory request 422 is for a read operation, the memory response 426 can include the requested data. If the memory request 422 is for a write operation, the memory response 426 can include an acknowledgment that the write operation was performed successfully. The first DRAM 410-1 can return the memory response 426 to the first memory controller 418-1.

The first memory controller 418-1 receives the memory response 426 from the first DRAM 410-1. Based on the memory response 426, the first memory controller 418-1 can prepare a memory response 428 and transmit the memory response 428 to the target 408 via the interconnect 416. The target 408 receives the memory response 428 from the first memory controller 418-1 via the interconnect 416. Based on this memory response 428, and responsive to the corresponding request 412, the target 408 can formulate a response 430 for the requested memory operation. The response 430 can include read data or a write acknowledgment and be formulated in accordance with one or more protocols of the interconnect 106.

To respond to the request 412 from the host device 104, the target 408 can transmit the response 430 to the initiator 404 over the interconnect 106. Thus, the initiator 404 receives the response 430 from the target 408 via the interconnect 106. The initiator 404 can therefore respond to the "originating" memory access request 420, which is from the processor 110 in this example. To do so, the initiator 404 prepares a memory access response 432 using the information from the response 430 and provides the memory access response 432 to the processor 110. In this way, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 404 and the target 408. Generally, the interconnect 106 can carry memory-related information, such as data or a memory address, between the initiator 404 and the target 408. In some cases, the initiator 404 or the target 408 (including both) can prepare memory-related information for communication across the interconnect 106 by encapsulating such information. The memory-related information can be encapsulated into, for example, at least one packet (e.g., a flit). One or more packets may include headers with information indicating or describing the content of each packet.

In example implementations, the interconnect 106 can support, enforce, or enable memory coherency for a shared memory system, for a cache memory, for combinations thereof, and so forth. Additionally or alternatively, the interconnect 106 can be operated based on a credit allocation system. Possession of a credit can enable an entity, such as the initiator 404, to transmit another memory request 412 to the target 408. The target 408 may return credits to "refill" a credit balance at the initiator 404. A credit-based communication scheme across the interconnect 106 may be implemented by credit logic of the target 408 or by credit logic of the initiator 404 (including by both working together in tandem).

The system 400, the initiator 404 of the host device 104, or the target 408 of the memory device 108 may operate or interface with the interconnect 106 in accordance with one or more physical or logical protocols. For example, the interconnect 106 may be built in accordance with a Peripheral Component Interconnect Express (PCIe or PCI-e) standard. Applicable versions of the PCIe standard may include 1.x, 2.x, 3.x, 4.0, 5.0, 6.0, and future or alternative versions. In some cases, at least one other standard is layered over the physical-oriented PCIe standard. For example, the initiator 404 or the target 408 can communicate over the interconnect 106 in accordance with a Compute Express Link (CXL) standard. Applicable versions of the CXL standard may include 1.x, 2.0, and future or alternative versions. The CXL standard may operate based on credits, such as read credits and write credits. In such implementations, the link controller 402 and the link controller 406 can be CXL controllers.

Examples of the data-transfer test mode 310 are described herein with reference to at least one memory controller 114 or 418 and at least one memory device 108 (e.g., having a memory array 204, a memory module 302, and/or a DRAM 410), including interconnected dies 120 thereof. The interconnected dies 120 are further described with respect to FIGS. 5 and 6.

Figure 5:
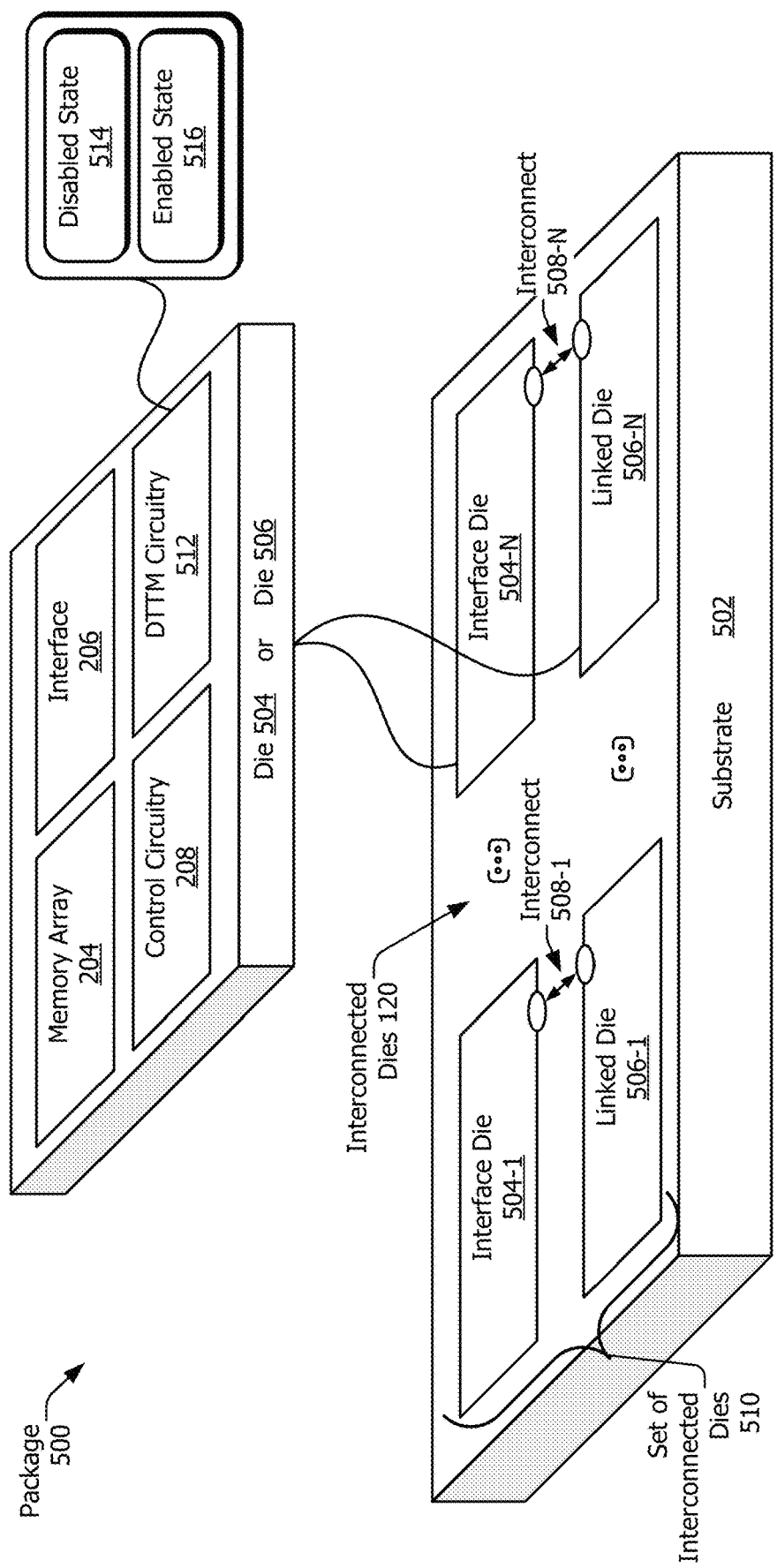
FIG. 5 illustrates an example package with at least some interconnected dies capable of operating in accordance with a data-transfer test mode.

FIG. 5 illustrates an example package 500 with interconnected dies 120. At least some of the interconnected dies 120 can individually operate according to the data-transfer test mode 310. Although not shown, the package 500 can also include other components, such as one or more other components of the memory device 108 and/or one or more components of the host device 104. In the depicted configuration, the package 500 includes a substrate 502. The interconnected dies 120 are disposed on or embedded in the substrate 502. The interconnected dies 120 include at least one interface die 504 and at least one linked die 506. In this example, the package 500 is shown to include interface dies 504-1 to 504-N and linked dies 506-1 to 506-N, where N represents a positive integer. Each linked die 506 is coupled to an interface die 504 via an interconnect 508. In FIG. 5, the linked dies 506-1 to 506-N are respectively coupled to the interface dies 504-1 to 504-N by the interconnects 508-1 to 508-N.

Although not explicitly shown, the interface die 504 is operatively coupled to the memory controller 114 or 418 (e.g., of FIG. 1 or 4) and acts as an interface between the linked die 506 and the memory controller 114 or 418 for at least data transfers or exchanges. Although the interface die 504 and the linked die 506 can behave differently, the interface die 504 and the linked die 506 can optionally be manufactured as a same type of die that includes the same circuit components. Once the package 500 is assembled, each of the dies 304 can be programmed to function as an interface die 504 or a linked die 506. As an example, the interconnected dies 120 can be programmed by setting at least one respective fuse in each die 304.

In example aspects, a set of interconnected dies 510 can refer to one interface die 504 and one linked die 506. However, other configurations are also possible in which an interface die 504 is operatively coupled to two or more linked dies 506. In general, the set of interconnected dies 510 refers to a group of interconnected dies 120 that are operatively coupled together. For example, the linked die 506 within the set of interconnected dies 510 is operatively coupled, via the interconnect 508, to the interface die 504 within the set of interconnected dies 510. Also, the interface die 504 within the set of interconnected dies 510 is operatively coupled, via the interconnect 508, to one or more linked dies 506 within the set of interconnected dies 510. In FIG. 5, the interface die 504-1 and the linked die 506-1 can represent a first set of interconnected dies 510, and the interface die 504-N and the linked die 506-N can represent an Nth set of interconnected dies 510.

The interconnects 508-1 to 508-N can transfer data between corresponding interface dies 504-1 to 504-N and linked dies 506-1 to 506-N, respectively. For example, the interconnect 508-1 can transfer data between the interface die 504-1 and the linked die 506-1. Likewise, the interconnect 508-N can transfer data between the interface die 504-N and the linked die 506-N. In an example implementation, the interconnects 508 support the transfer of 128 bits (e.g., 16 bytes) per access. Although the interconnects 508-1 to 508-N are illustrated with individual lines in FIG. 5, each interconnect 508 can include at least one bus, at least one switching fabric, one or more wires or traces that carry voltage or current signals, at least one switch, one or more buffers, and so forth.

The interface die 504 and the linked die 506 can each include at least one memory array 204, at least one interface 206, and control circuitry 208. The interface 206 can couple the control circuitry 208 or the memory array 204 directly or indirectly to the interconnect 508. The interface 206 can also include a data bus.

Figure 10:
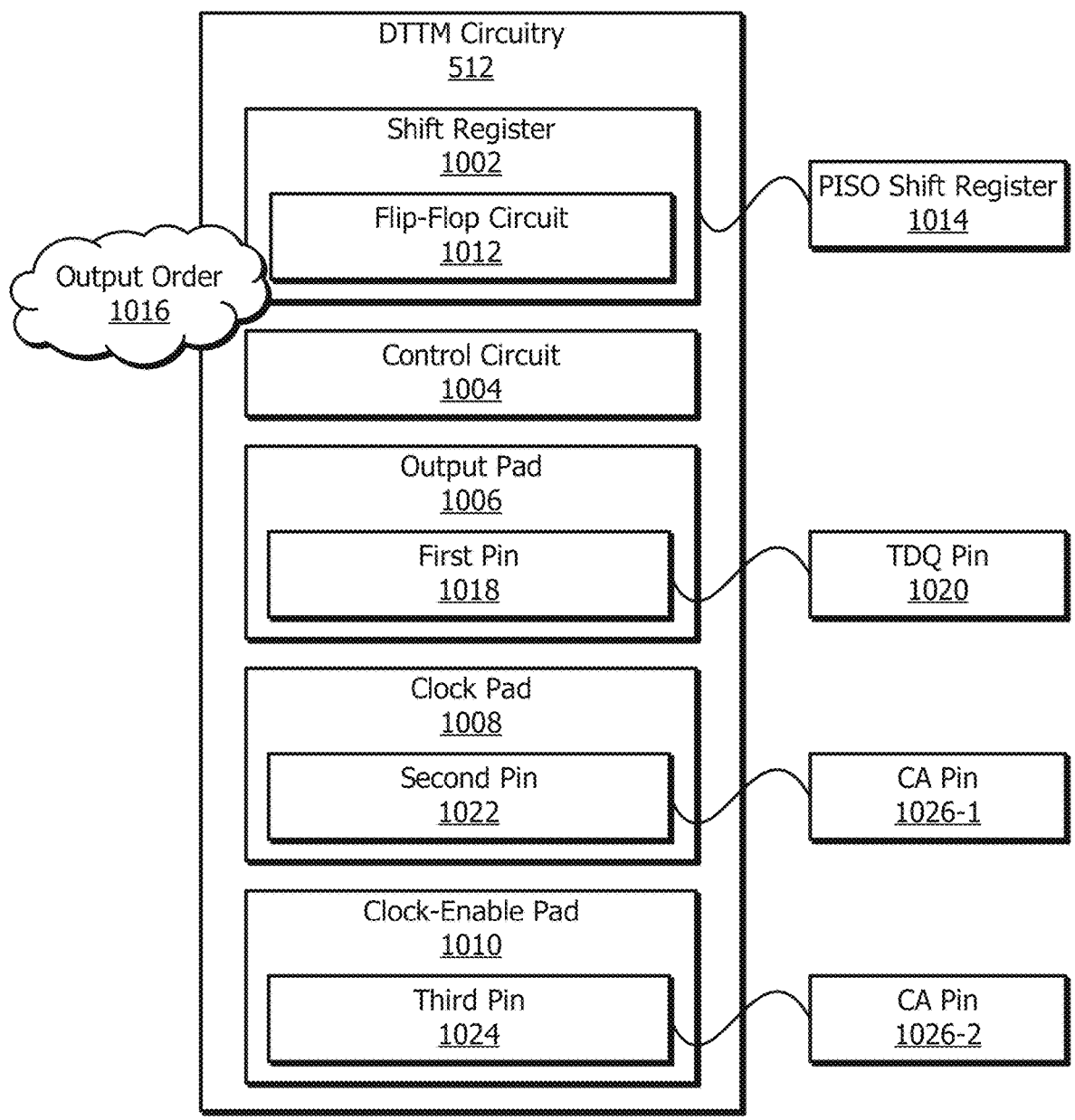
FIG. 10 illustrates example components of data-transfer test-mode circuitry that enables operation of a data-transfer test mode.

To enable operation of the data-transfer test mode 310, the interface die 504 also includes data-transfer test-mode circuitry 512 (DTTM circuitry 512), which is further described with respect to FIG. 10. The linked die 506 can optionally include the data-transfer test-mode circuitry 512. By including the data-transfer test-mode circuitry 512 within the linked die 506, the manufacturing process can be simplified by fabricating a die 304 that can selectively operate (and be tested) as the interface die 504 or the linked die 506. The data-transfer test-mode circuitry 512 can selectively be in a disabled state 514 or an enabled state 516. During the interconnected mode 308, the data-transfer test-mode circuitry 512 is in the disabled state 514, which enables write data to be transferred from the interface die 504 to the linked die 506 across the interconnect 508 in accordance with the write operation 312. During the data-transfer test mode 310, the data-transfer test-mode circuitry 512 is in the enabled state 516, which enables write data that is meant for the linked die 506 to be re-routed for evaluation purposes. Consequently, the write data that is meant for the linked die 506 does not pass through the interconnect 508 and is not received by the linked die 506 during the data-transfer test mode 310. Example pins of the interface die 504 and the linked die 506 are further described with respect to FIG. 6.

Figure 6:
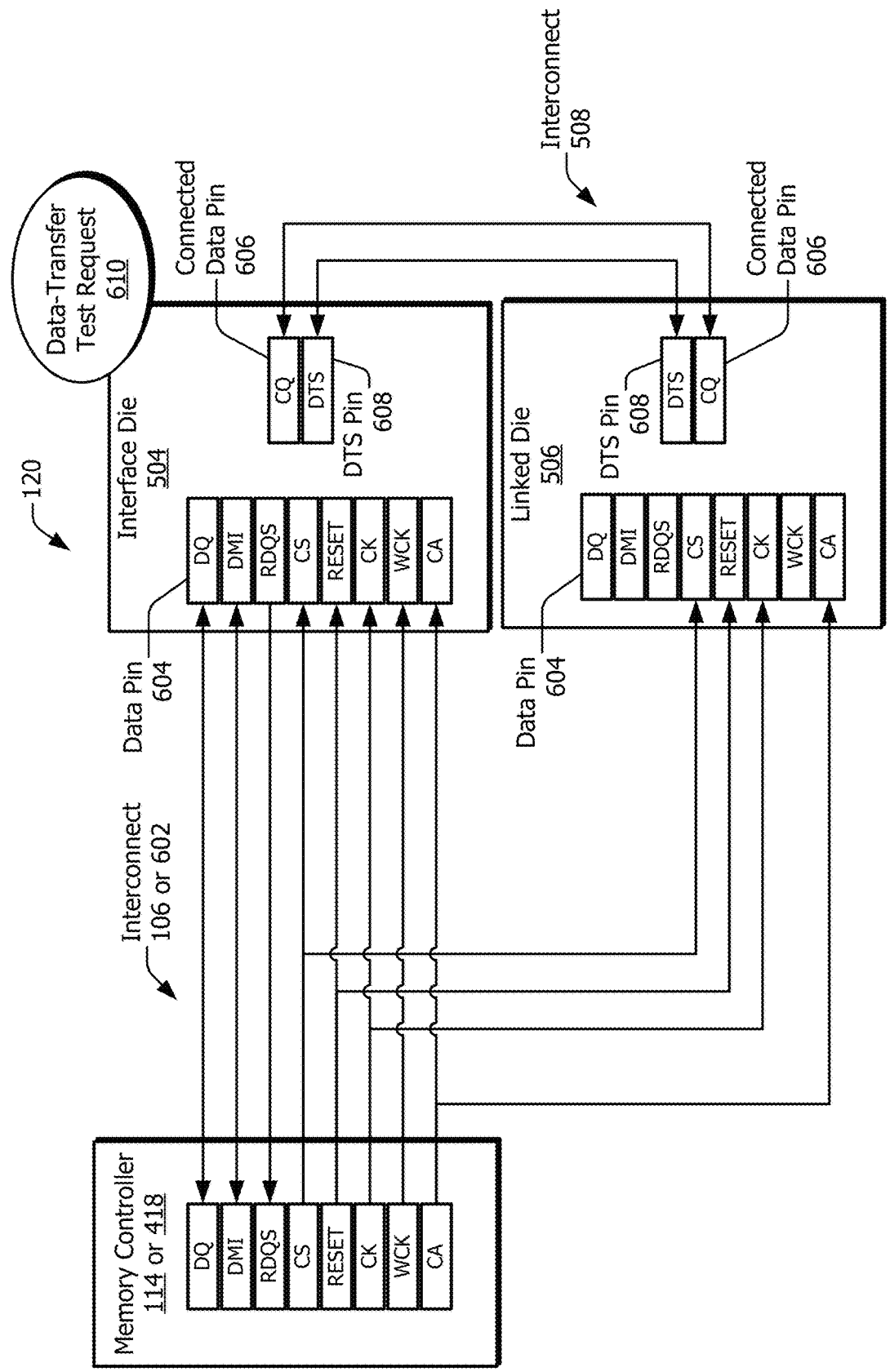
FIG. 6 illustrates example connections between a memory controller and multiple interconnected dies.

FIG. 6 illustrates example connections between the memory controller 114 or 418 and multiple interconnected dies 120 of the memory device 108. In the case of the memory controller 114, the interconnect 106 can provide multiple lines of electrical communication between the memory controller 114 and each die of the interconnected dies 120. Alternatively, in the case of the memory controller 418, an interconnect 602 can provide multiple lines of electrical communication between the memory controller 418 and each die of the interconnected dies 120. The lines of the interconnect 106 or 602 may correspond to clock (CK) lines, write clock (WCK) lines, write mask lines, command-and-address (CA) lines, or other memory communication lines. With the interconnect 106 or 602, the interface die 504 and the linked die 506 can receive commands from a common command and address bus.

The interface die 504 and the linked die 506 each include a data pin 604, a connected data pin 606 (CQ 606), and a data tracking signal (DTS) pin 608 (DTS 608). The data pin 604 can represent multiple pins that enable the transfer of multiple bits per access. For example, the data pin 604 can represent eight pins. The data pin 604 may comport, at least partially, with LPDDR5, to another standard, or to no public standard. The interface die 504 and the linked die 506 differ in that the data pin 604 of the interface die 504 is active and operatively coupled to the memory controller 114 or 418. In this way, the interface die 504 can "directly" transmit data to or "directly" receive data from the memory controller 114 or 418 without using another die as an intermediary for sending data to the memory controller 114 or 418 or receiving data from the memory controller 114 or 418. In contrast, the data pin 604 of the linked die 506 is inactive and not operatively coupled to the memory controller 114 or 418. Explained another way, the data pin 604 is floating such that current does not flow through the data pin 604. As such, the linked die 506 is unable to directly communicate with the memory controller 114 or 418. In particular, the linked die 506 is unable to directly transmit data to or directly receive data from the memory controller 114 or 418. Instead, the linked die 506 can "indirectly" communicate with the memory controller 114 or 418 via at least one other die—the interface die 504, which is described next.

The interface die 504 and the linked die 506 each include a connected data pin 606 and a data-tracking-signal pin 608 (DTS pin 608). The connected data pin 606 and the data-tracking-signal pin 608 can each represent multiple pins that enable the transfer of multiple bits per access. For example, the connected data pin 606 can represent 32 pins and the data-tracking-signal pin 608 can represent 2 pins. The interconnect 508 operatively couples the linked die 506 to the interface die 504 via the connected data pin 606 of each die and via the data-tracking-signal pin 608 of each die. With the interconnect 508, the connected data pins 606, and the data-tracking-signal pin 608, the linked die 506 can transmit data to or receive data from the interface die 504 during the interconnected mode 308. In particular, the interface die 504 can transfer data from the memory controller 114 or 418 to the linked die 506 during the write operation 312. Also, the interface die 504 can transfer data from the linked die 506 to the memory controller 114 or 418 during the read operation 314. In this way, the linked die 506 can indirectly transmit data to or indirectly receive data from the memory controller 114 or 418 through the interface die 504. Explained another way, the interface die 504 acts as an interface for the linked die 506 and passes data between the linked die 506 and the memory controller 114 or 418 in accordance with the interconnected mode 308.

The interconnected die architecture illustrated in FIG. 6 can reduce cost and conserve space within the apparatus 102. For example, the interconnect 106 or 602 can be implemented with fewer lines of electrical communication as fewer pins on the linked die 506 may be active relative to the interface die 504.

Prior to integration within the interconnected die architecture, the interface die 504 is not operatively coupled to the linked die 506 via the connected data pin 606 and the data-tracking-signal pin 608. In this case, the interface die 504 can be on a wafer or a single die package. To perform testing or debugging prior to integration, the interface die 504 can receive a data-transfer test request 610 from an external source (e.g., a test engine) or from an internal source (e.g., a mode register of the registers 210). The data-transfer test request 610 instructs the interface die 504 to operate according to the data-transfer test mode 310. In particular, the data-transfer test request 610 causes the interface die 504 to perform aspects of the write operation 312 and enables evaluation of a portion of write data that is intended for the linked die 506. Example components of the interface die 504 and/or the linked die 506 are further described with respect to FIG. 7.

Figure 7:
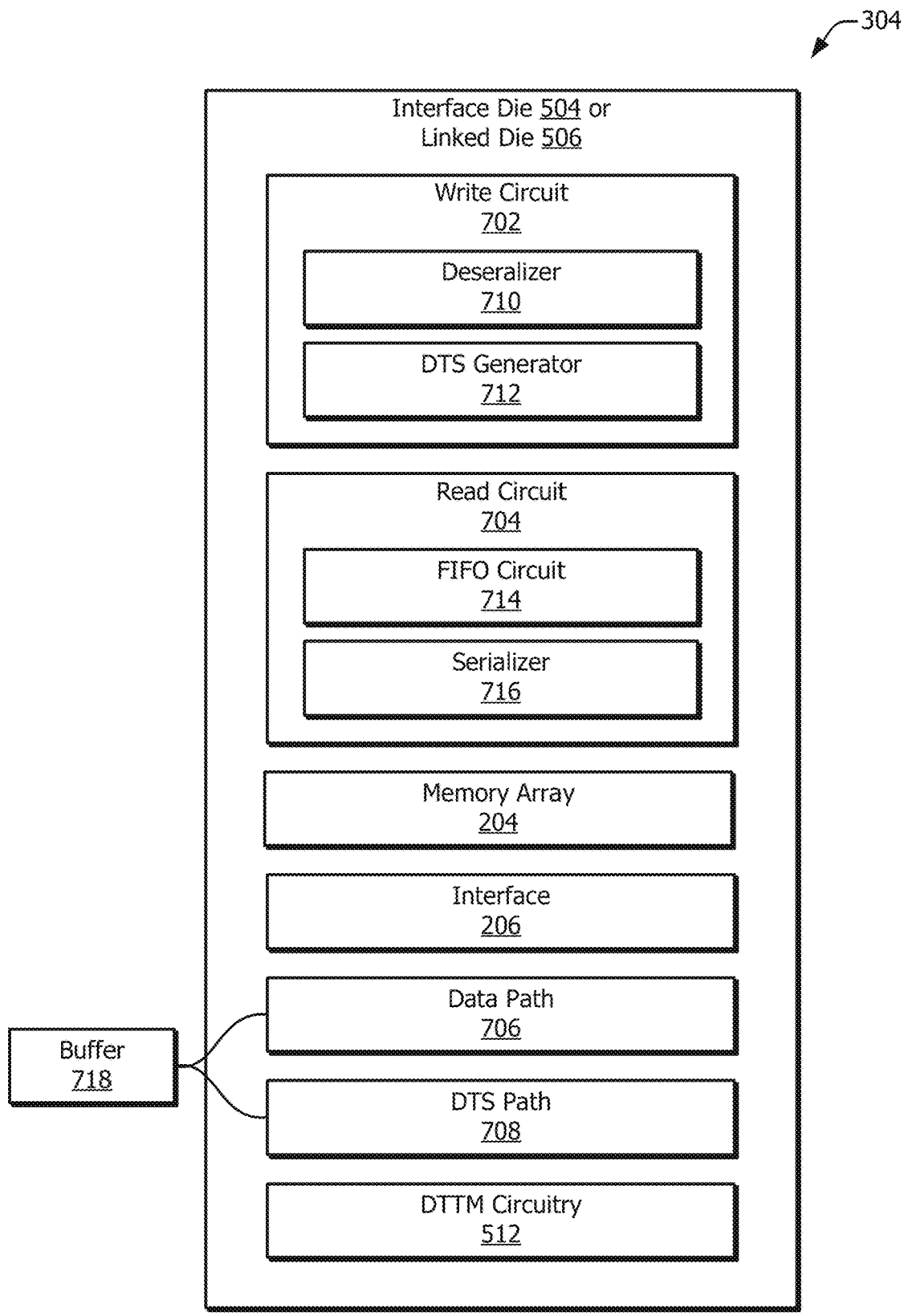
FIG. 7 illustrates example components of an interface die and a linked die.

FIG. 7 illustrates example components of a die 304, which can be configured as the interface die 504 or the linked die 506 once integrated as part of the interconnected die architecture. The die 304 includes at least one write circuit 702, at least one read circuit 704, the interface 206, and the memory array 204. The die 304 also includes at least one data path 706 and at least one data-tracking-signal path 708. The write circuit 702 and/or the read circuit 704 can be implemented as part of the control circuitry 208 or the interface 206.

If the die 304 is configured as an interface die 504 during the write operation 312, the write circuit 702 enables data to be written to the memory array 204 of the die 304 and the memory array 204 of another die of the interconnected dies 120. If the die 304 is configured as a linked die 506 during the write operation 312, the write circuit 702 can be disabled. The write circuit 702 also enables at least a portion of data to be transferred to the connected data pin 606 during the data-transfer test mode 310.

The write circuit 702 includes a deserializer 710 and a data-tracking-signal generator 712. The deserializer 710 provides serial-to-parallel data conversion and separates chunks of data during the write operation 312 and during the data-transfer test mode 310. The data-tracking-signal generator 712 generates data tracking signals during the write operation 312 and during the data-transfer test mode 310. The data tracking signal contains information about where the data is to be stored in the memory array 204 and the timing associated with the data.

If the die 304 is configured as an interface die 504 during the read operation 314, the read circuit 704 enables data to be read from the memory array 204 of the die 304 and the memory array 204 of another die of the interconnected dies 120. If the die 304 is configured as a linked die 506 during the read operation 314, the read circuit 704 can be disabled. During the data-transfer test mode 310, the read circuit 704 can be disabled.

The read circuit 704 includes at least one first-in first-out circuit 714 and at least one serializer 716. In general, the first-in first-out circuit 714 operates in a pipelined fashion. The serializer 716 provides parallel-to-series data conversion and combines chunks of read data from the interface die 504 and the linked die 506 during the read operation 314.

The data path 706 propagates data between the data pin 604, the memory array 204, and the connected data pin 606. The data-tracking-signal path 708 propagates a data tracking signal between the data-tracking-signal generator 712, the memory array 204, the read circuit 704, and the data-tracking-signal pin 608. The data path 706 and the data-tracking-signal path 708 can include one or more buffers 718. The buffers 718 can be used to drive the data and the data-tracking-signal according to a current mode (e.g., according to the interconnected mode 308 or the data-transfer test mode 310). In some cases, different combinations of buffers 718 can be enabled according to the write operation 312, the read operation 314, and/or the data-transfer test mode 310.

To implement aspects of the data-transfer test mode 310, the die 304 can include additional components, such as the data-transfer test-mode circuitry 512. The data-transfer test-mode circuitry 512 is further described with respect to FIG. 10. Operations of the die 304 are further described with respect to FIGS. 8-1 to 9-2.

Figures 1, 8:
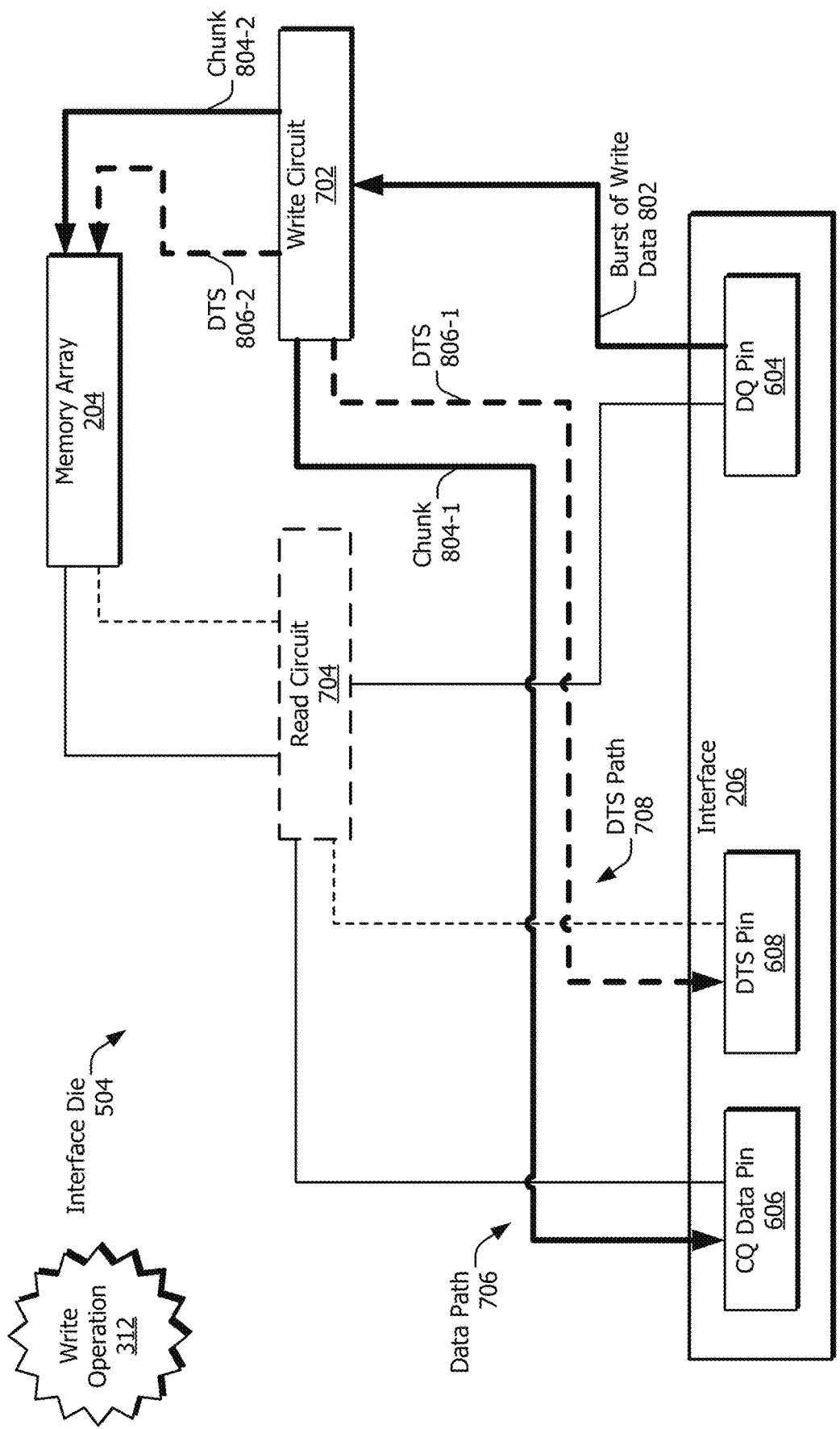
Figures 2, 8:
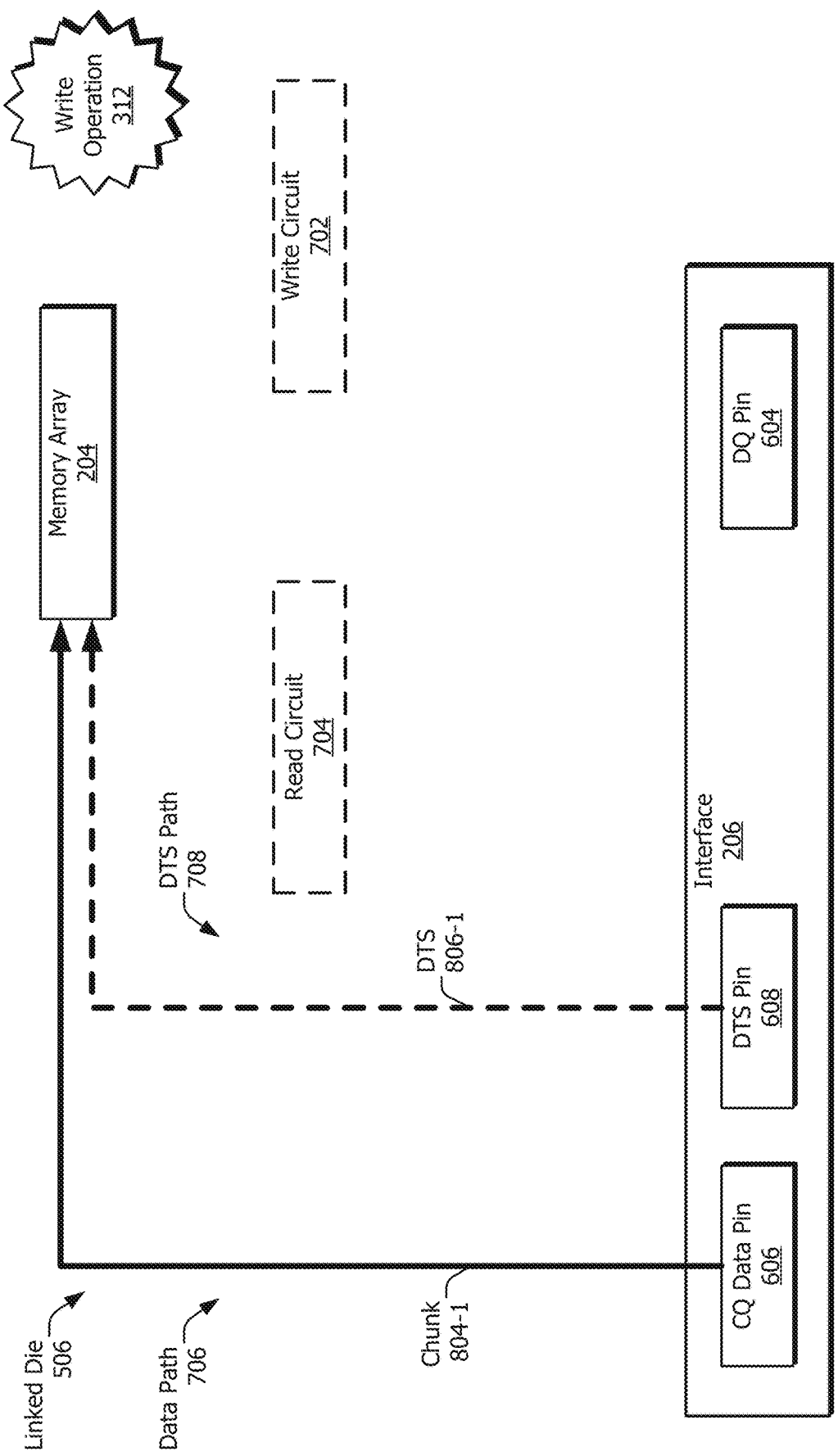

FIG. 8-1 illustrates an example interface die 504 performing aspects of the write operation 312 in accordance with the interconnected mode 308. In the depicted configuration, the write circuit 702 is coupled to the interface 206 and the memory array 204. The read circuit 704 is also coupled to the memory array 204 and the interface 206. The interface die 504 includes data paths 706, which are indicated using solid lines, and data-tracking-signal paths 708, which are indicated using dashed lines. Although not explicitly shown, the interface die 504 is integrated within the interconnected die architecture such that the connected data pin 606 and the data-tracking-signal pin 608 are coupled to corresponding pins of a linked die 506, which is shown in FIG. 8-2.

Some components of the interface die 504 can be optionally disabled during the write operation 312. These components are indicated using dashed lines. For example, the read circuit 704 can optionally be disabled during the write operation 312.

During the write operation 312, the interface die 504 receives, from the memory controller 114 or 418, one or more bursts of write data 802 at the data pin 604 of the interface 206. Each burst of write data 802 includes multiple chunks 804. For instance, a burst of write data 802 includes a first chunk 804-1 and a second chunk 804-2. Each burst of write data 802 can include, for instance, 32 bytes in accordance with a mode of the memory device 108. In example implementations, the first chunk 804-1 can correspond to a lower 16 bytes, and the second chunk 804-2 can correspond to an upper 16 bytes. In other words, the first chunk 804-1 can include a least-significant byte, and the second chunk 804-2 can include a most-significant byte. In total, the first chunk 804-1 and the second chunk 804-2 represent the 32 bytes of the burst of write data 802. Bursts of write data 802 can, however, be of different lengths, such as 16 bytes. In this case, each chunk 804 can represent 8 bytes of the burst of write data 802.

As each chunk 804 is received, the interface die 504 passes the chunk 804 through the deserializer 710 of the write circuit 702. In general, the deserializer 710 operates in a pipelined fashion on a previously received chunk 804 as a next chunk 804 is received at the data pin 604 of the interface die 504. For example, the deserializer 710 operates on the first chunk 804-1 as the interface die 504 receives the second chunk 804-2 from the memory controller 114 or 418.

After deserialization, the interface die 504 transfers (e.g., propagates or passes) one of the chunks 804 (e.g., chunk 804-1) from the write circuit 702 to the connected data pin 606 using the data path 706. The interface die 504 also transfers another one of the chunks 804 (e.g., chunk 804-2) from the write circuit 702 to the memory array 204 using the data path 706. As an example, the interface die 504 transfers odd-numbered chunks 804 to the linked die 506 (when starting to count from one), and writes even-numbered chunks 804 to its memory array 204 (when starting to count from one). As another example, the interface die 504 writes odd-numbered chunks 804 to its memory array 204 (when starting to count from one), and transfers even-numbered chunks 804 to the linked die 506 (when starting to count from one).

The interface die 504 also generates a first data tracking signal 806-1 (DTS 806-1) associated with the chunk 804-1 and a second data tracking signal 806-2 (DTS 806-2) associated with the chunk 804-2. Using the data-tracking-signal path 708, the interface die 504 transfers the data tracking signal 806-1 from the write circuit 702 to the data-tracking-signal pin 608. The interface die 504 also uses the data-tracking-signal path 708 to transfer the data tracking signal 806-2 to the memory array 204. The linked die 506 accepts the chunk 804-1 and the data tracking signal 806-1, as further described with respect to FIG. 8-2.

FIG. 8-2 illustrates an example linked die 506 performing aspects of the write operation 312 in accordance with the interconnected mode 308. In the depicted configuration, the interface 206 is coupled to the memory array 204. Some components of the linked die 506 can be optionally disabled during the write operation 312. These components are indicated using dashed lines. In this example, the write circuit 702 and the read circuit 704 can optionally be disabled during the write operation 312. Although not explicitly shown, the read circuit 704 and/or the write circuit 702 can be coupled to the memory array 204 and the interface 206 via the data path 706 and the data-tracking-signal path 708 as shown in the interface die 504.

During the write operation 312, the linked die 506 uses the data path 706 and the data-tracking-signal path 708 to respectively transfer the chunk 804-1 and the data tracking signal 806-1 to the memory array 204. In particular, the linked die 506 uses the data path 706 to transfer the chunk 804-1 from the connected data pin 606 to the memory array 204. Additionally, the linked die 506 uses the data-tracking-signal path 708 to transfer the data tracking signal 806-1 from the data-tracking-signal pin 608 to the memory array 204. The linked die 506 writes the chunk 804-1 to the memory array 204. The read operation 314 is further described with respect to FIGS. 9-1 and 9-2.

Figures 1, 9:
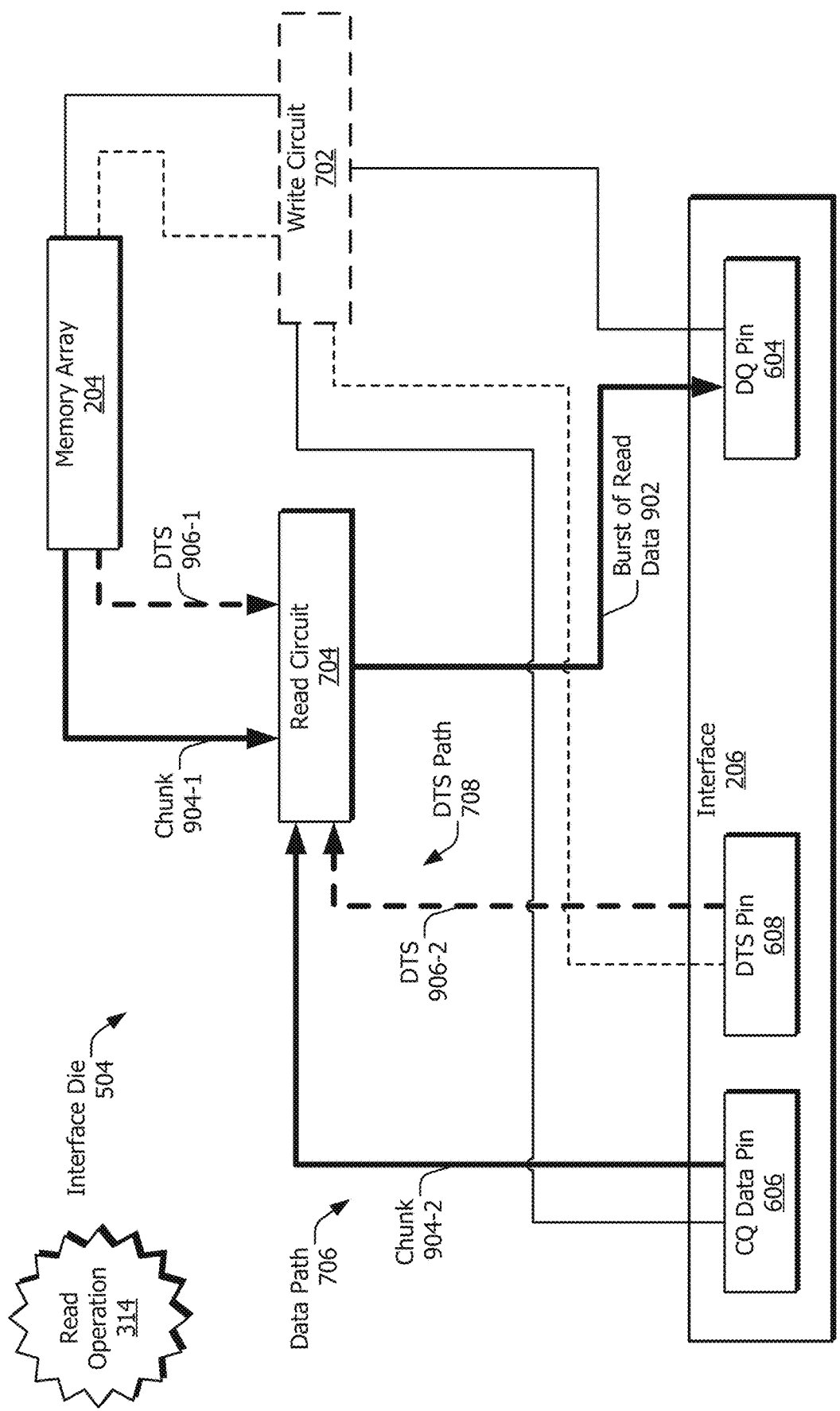
Figures 2, 9:
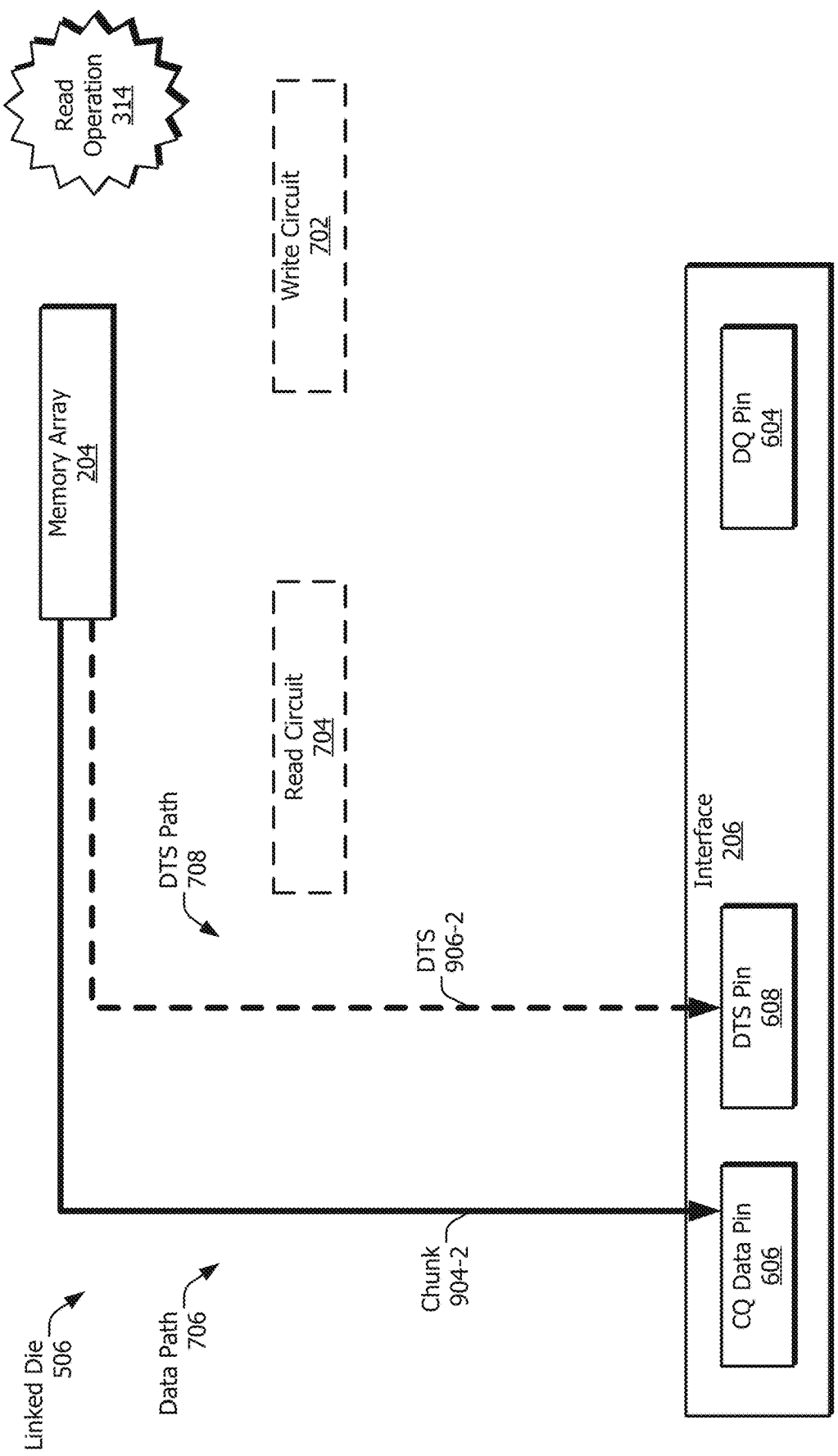

FIG. 9-1 an example interface die 504 performing aspects of the read operation 314 in accordance with the interconnected mode 308. Although not explicitly shown, the interface die 504 is integrated within the interconnected die architecture such that the connected data pin 606 and the data-tracking-signal pin 608 are coupled to corresponding pins of a linked die 506, which is shown in FIG. 9-2.

Some components of the interface die 504 can be optionally disabled during the read operation 314. These components are indicated using dashed lines. For example, the write circuit 702 can optionally be disabled during the read operation 314.

During the read operation 314, the interface die 504 transmits a burst of read data 902 to the memory controller 114 or 418. The burst of read data 902 includes a first chunk 904-1 and a second chunk 904-2. The burst of read data 902 can include, for instance, 32 bytes in accordance with a mode of the memory device 108. In example implementations, the first chunk 904-1 can correspond to an upper 16 bytes, and the second chunk 904-2 can correspond to a lower 16 bytes. In other words, the first chunk 904-1 can include a most-significant byte, and the second chunk 904-2 can include the least-significant byte. In total, the first chunk 904-1 and the second chunk 904-2 represent 32 bytes. Bursts of read data 902 can, however, be of different lengths, such as 16 bytes. In this case, each chunk 904 can represent 8 bytes of the burst of read data 902.

To transmit the burst of read data 902 to the memory controller 114 or 418, the interface die 504 can read one of the chunks 904 (e.g., the chunk 904-1) from its memory array 204 and receive another one of the chunks 904 (e.g., the chunk 904-2) from the linked die 506 via the data-tracking-signal pin 608. Using the data path 706 and the data-tracking-signal path 708, the interface die 504 transfers the chunk 904-1 and its corresponding data tracking signal 906-1 from the memory array 204 to the read circuit 704. The interface die 504 also transfers the chunk 904-2 and its corresponding data tracking signal 906-2 from the interface 206 to the read circuit 704. The first-in first-out circuit 714 and the serializer 716 of the read circuit 704 generate the burst of read data 902 based on the chunks 904-1 and 904-2.

In an example implementation, the interface die 504 reads odd-numbered chunks 904 from its memory array 204 (when starting to count from one), and receives even-numbered chunks 904 from the linked die 506 (when starting to count from one). As another example, the interface die 504 receives odd-numbered chunks 904 from the linked die 506 (when starting to count from one), and reads even-numbered chunks 904 from its memory array 204 (when starting to count from one). The linked die 506 transmits the chunk 904-2 and the data tracking signal 906-2 to the interface die 504, as further described with respect to FIG. 9-2.

FIG. 9-2 illustrates an example linked die 506 performing aspects of the read operation 314 in accordance with the interconnected mode 308. In the depicted configuration, the interface 206 is coupled to the memory array 204. Although not explicitly shown, the read circuit 704 and/or the write circuit 702 can be coupled to the memory array 204 and the interface 206 via the data path 706 and the data-tracking-signal path 708 as shown in the interface die 504.

Some components of the linked die 506 can be optionally disabled during the read operation 314. These components are indicated using dashed lines. In this example, the write circuit 702 and the read circuit 704 can optionally be disabled during the read operation 314.

During the read operation 314, the linked die 506 reads the chunk 904-2 from the memory array 204. The linked die 506 uses the data path 706 to transfer the chunk 904-2 from the memory array 204 to the connected data pin 606. Also, the linked die 506 uses the data-tracking-signal path 708 to transfer the data tracking signal 906-2 from the memory array 204 to the data-tracking-signal pin 608.

Although not explicitly shown in FIGS. 8-1 to 9-2 for simplicity, the interface die 504 of FIGS. 8-1 and 9-1 (and optionally the linked die 506 of FIGS. 8-2 and 9-2) can also include the data-transfer test-mode circuitry 512, which is further described with respect to FIG. 10. The data-transfer test-mode circuitry 512 can be in an enabled state during the data-transfer test mode 310 and can be in a disabled state during the interconnected mode 308.

FIG. 10 illustrates example components of the data-transfer test-mode circuitry 512 that enables operation of the data-transfer test mode 310. In the depicted configuration, the data-transfer test-mode circuitry 512 includes at least one shift register 1002 and at least one control circuit 1004. The data-transfer test-mode circuitry 512 also includes at least one output pad 1006, at least one clock pad 1008, and at least one clock-enable pad 1010. Although described as part of the data-transfer test-mode circuitry 512 in FIG. 10, the output pad 1006, the clock pad 1008, and the clock-enable pad 1010 can alternatively be considered a part of the die 304. In general, the data-transfer test-mode circuitry 512 includes or is connected to the output pad 1006, the clock pad 1008, and the clock-enable pad 1010.

The shift register 1002 enables information intended for the linked die 506 to be transferred to the output pad 1006 for evaluation in accordance with the data-transfer test mode 310. The shift register 1002 can be implemented using multiple flip-flop circuits 1012. In some implementations, the shift register 1002 is implemented as a parallel-in serial-out shift register 1014 (P ISO shift register 1014).

A design of the shift register 1002 can specify an output order 1016 in which bits appear at the output pad 1006. In some examples, the output order 1016 corresponds to a positional layout of the connected data pin 606 and the data tracking signal pin 608 relative to the output pad 1006, as further described with respect to FIGS. 13-1 and 13-2. With this type of output order 1016, routing between flip-flop circuits 1012 of the shift register 1002 can be simplified. In other examples, the output order 1016 groups bits associated with the chunk 804-1 together and groups bits associated with the data tracking signal 806-1 together, even if the connected data pins 606 and the data tracking signal pins 608 are interspersed across the die 304. This output order 1016 can make it easier to interpret the data presented at the output pad 1006 at the cost of additional routing complexity.

The shift register 1002 enables the data-transfer test-mode circuitry 512 to support the data-transfer test mode 310 without substantially increasing the cost, complexity, and footprint of the die 304. The data-transfer test-mode circuitry 512, however, is not limited to implementations that utilize the shift register 1002. Other types of implementations are also possible, including those that utilize a multiplex (e.g., a multiplexing circuit).

The control circuit 1004 controls an operation of the shift register 1002. In particular, the control circuit 1004 can specify commands to enable the shift register 1002 to operate during the data-transfer test mode 310 and disable the shift register 1002 during the interconnected mode 308 to enable data to pass to another interconnected die 120.

The output pad 1006 has read-out capabilities, which enables data to be transmitted. In particular, the output pad 1006 includes at least one first pin 1018, which enables information to be transmitted to a test engine or evaluated by a test engineer during the data-transfer test mode 310. In an example implementation, the first pin 1018 can be implemented using a pin that is also used during the interconnected mode 308. For example, the first pin 1018 can be a termination data (TDQ) pin 1020 (TDQ pin 1020), which provides termination during the interconnected mode 308. In another example implementation, the first pin 1018 can represent a pin that is dedicated for testing or debugging and is not used during the interconnected mode 308. The output pad 1006 can be positioned proximate to the shift register 1002 to reduce routing complexity.

In some implementations, the data-transfer test-mode circuitry 512 includes a single output pad 1006. This can enable the data-transfer test-mode circuitry 512 to have a smaller footprint within the die 304. In other implementations, the data-transfer test-mode circuitry 512 can include multiple output pads 1006 (e.g., at least two output pads 1006). With additional output pads 1006, the data-transfer test-mode circuitry 512 can output test result data during the data-transfer test mode 310 at a faster rate compared to implementations that include a single output pad 1006. However, the additional output pads 1006 can increase a size and complexity of the data-transfer test-mode circuitry 512.

The clock pad 1008 and the clock-enable pad 1010 have drive capabilities, which enables signals to be accepted and passed to the shift register 1002 during the data-transfer test mode 310. These signals control a timing and operation of the shift register 1002. The clock pad 1008 includes at least one second pin 1022, and the clock-enable pad 1010 includes at least one third pin 1024. In an example implementation, the second pin 1022 and/or the third pin 1024 are implemented using pins that are also used during the interconnected mode 308. For example, the second pin 1022 can be a command-and-address pin 1026-1 (CA pin 1026-1), and the third pin 1024 can be another command-and-address pin 1026-2 (CA pin 1026-2). During the interconnected mode 308, the CA pins 1026-1 and 1026-2 accept command-and-address signals. The command-and-address pins 1026-1 and 1026-2 can be command-and-address pins 1026 that are positioned proximate to the shift register 1002 compared to other command-and-address pins of the die 304. In this way, routing can be simplified between the command-and-address pins 1026-1 and 1026-2 and the shift register 1002. In another example implementation, the second pin 1022 and/or the third pin 1024 are implemented using pins that are dedicated for testing and debugging and are not used during the interconnected mode 308.

Although not explicitly shown, the data-transfer test-mode circuitry 512 can also include buffers or switches, which are controlled based on the operational state of the data-transfer test-mode circuitry 512 (e.g., controlled by the control circuit 1004). During the disabled state 514, these components can route (e.g., pass or transfer) a first chunk 804-1 of the burst of write data 802 to the interconnect 508 via the connected data pin 606 and route the data tracking signal 806-1 to the interconnect 508 via the data-tracking-signal pin 608. In other words, these components can cause the data path 706 and the data-tracking-signal path 708 to bypass the shift register 1002. During the enabled state 516, these components can route the first chunk 804-1 of the burst of write data 802 and the data tracking signal 806-1 to the shift register 1002. Depending on the implementation, the first chunk 804-1 of the burst of write data 802 and the data tracking signal 806-1 may or may not be available at the connected data pin 606 and the data-tracking-signal pin 608, respectively, during the data-transfer test mode 310.

The data-transfer test-mode circuitry 512 enables aspects of a write operation to be evaluated regardless of whether or not the interface die 504 is integrated within the linked die architecture. An operation of the data-transfer test mode 310 is further described with respect to FIG. 11.

Figure 11:
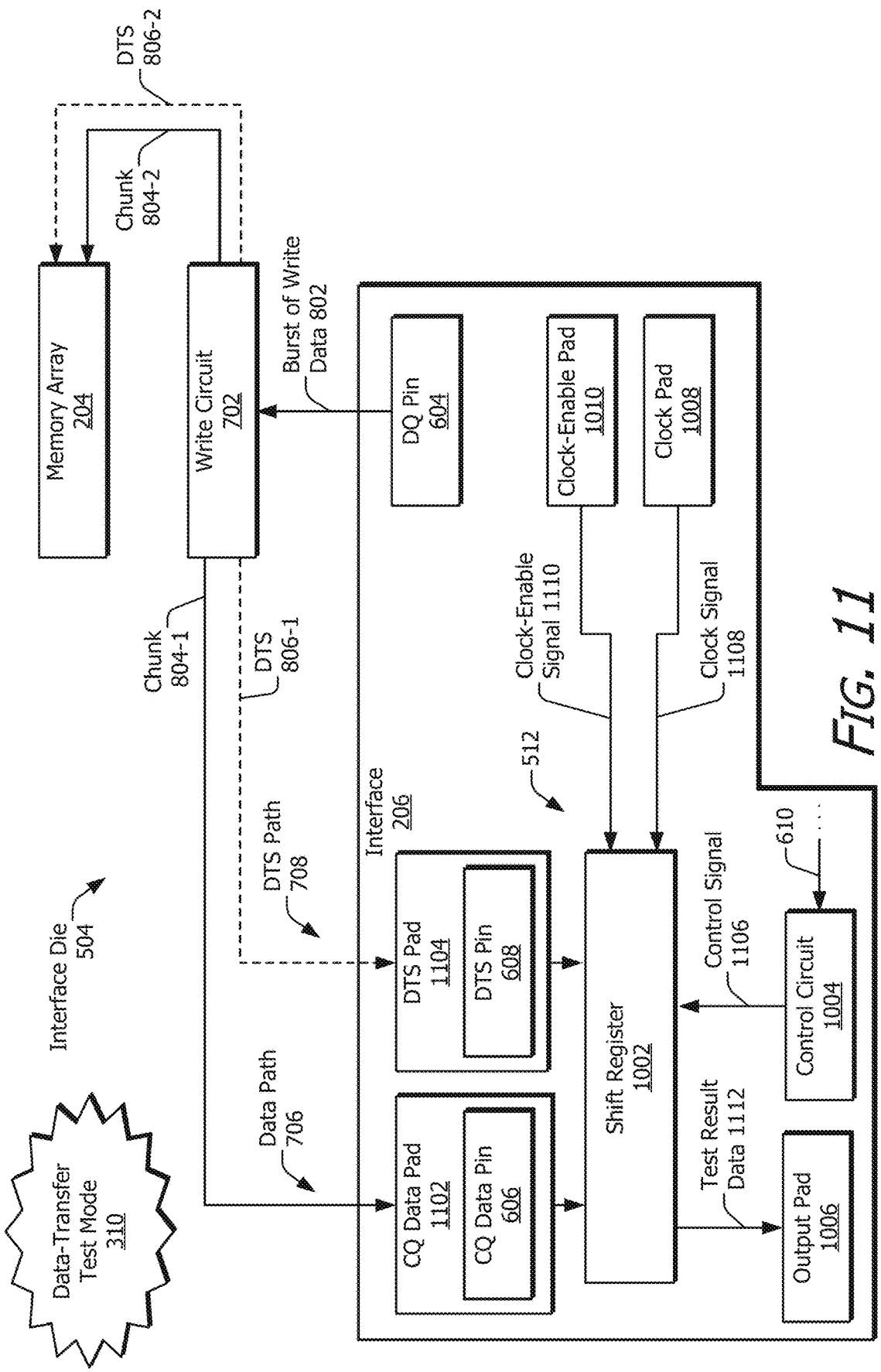
FIG. 11 illustrates an example die operating in accordance with a data-transfer test mode.

FIG. 11 illustrates an example interface die 504 operating in accordance with the data-transfer test mode 310. The interface die 504 of FIG. 11 is similar to the interface die 504 of FIGS. 8-1 and 9-1. In contrast to FIGS. 8-1 and 9-1, the interface die 504 of FIG. 11 is explicitly shown to include the data-transfer test-mode circuitry 512. In particular, the interface die 504 of FIG. 11 includes the shift register 1002, the control circuit 1004, the output pad 1006, the clock pad 1008, and the clock-enable pad 1010. In FIG. 11, the interface die 504 is also shown to include at least one connected data pad 1102 and at least one data-tracking-signal pad 1104. Although one connected data pad 1102 and one data-tracking-signal pad 1104 are explicitly depicted in FIG. 11, the connected data pad 1102 and the data-tracking-signal pad 1104 can each represent multiple pads. In general, each connected data pin 606 is part of a corresponding connected data pad 1101, and each data-tracking-signal pin 608 is part of a corresponding data-tracking-signal pad 1104. In other words, the interface die 504 can have a same quantity of connected data pads 1102 as connected data pins 606 (e.g., 32) and a same quantity of data-tracking-signal pads 1104 as data-tracking-signal pins 608 (e.g., 2). The connected data pad 1102 and the data-tracking-signal pad 1104 can also be generically referred to as data-transfer pads, as further described with respect to FIG. 12. As shown in FIG. 11, the shift register 1002 is coupled to the connected data pad 1102, the data-tracking-signal pad 1104, the control circuit 1004, the output pad 1006, the clock pad 1008, and the clock-enable pad 1010.

During the data-transfer test mode 310, the die 304 is configured as an interface die 504. The die 304, however, can be configured as the interface die 504 or the linked die 506 within an interconnected die architecture (e.g., during the interconnected mode 308). Prior to integrating the die 304 within the interconnected die architecture, the connected data pad 1102 and the data-tracking-signal pad 1104 are not connected to corresponding pads of another die within the interconnected die architecture (e.g., a linked die 506). As such, the connected data pin 606 and the data-tracking-signal pin 608 are floating (e.g., not connected to the corresponding pins of a linked die 506).

The interface die 504 receives the data-transfer test request 610, which causes the interface die 504 to operate in accordance with the data-transfer test mode 310. In some implementations, the data-transfer test request 610 represents a test-mode sequence, which can be decoded by the control circuit 1004. The control circuit 1004 accepts the data-transfer test request 610 and generates a control signal 1106, which causes the data-transfer test-mode circuitry 512 to be in the enabled state 516. Using the control signal 1106, the control circuit 1004 can enable the shift register 1002 and cause any switches or buffers in the data-transfer test-mode circuitry 512 to route signals to the shift register 1002 in addition to or instead of routing signals to the connected data pin 606 and the data-tracking-signal pin 608.

In accordance with the data-transfer test mode 310, the interface die 504 performs a write operation, which can be similar to the write operation 312 performed by the interface die 504 during the interconnected mode 308, as shown in FIG. 8-1. Instead of transferring one of the chunks 804 of the burst of write data 802 and a corresponding data tracking signal 806 to the linked die 506 according to the write operation 312, however, the interface die 504 transfers this information to the output pad 1006 for evaluation, as further described below.

Responsive to receiving the data-transfer test request 610, the interface die 504 accepts a burst of write data 802 at the data pin 604. The burst of write data 802 includes a first chunk 804-1 and a second chunk 804-2. In accordance with the data-transfer test mode 310, the interface die 504 passes one of the chunks 804 (e.g., chunk 804-1) to the connected data pad 1102, and passes a corresponding data tracking signals 806 (e.g., the data tracking signal 806-1) to the data-tracking-signal pad 1104. The interface die 504 can optionally write another one of the chunks 804 (e.g., chunk 804-2) to its memory array 204 using the data tracking signal 806-2.

The shift register 1002 accepts the first chunk 804-1 of the burst of write data 802 from the connected data pad 1102 and accepts the first data-tracking-signal 806-1 from the data-tracking-signal pad 1104. The shift register 1002 also accepts a clock signal 1108 and a clock-enable signal 1110 from the clock pad 1008 and the clock-enable pad 1010, respectively. The clock signal 1108 controls a timing of a shift function performed by the shift register 1002. The clock-enable signal 1110 enables the shift register 1002 to utilize the clock signal 1108. In accordance with the clock signal 1108 and the clock-enable signal 1110, the shift register 1002 passes the first chunk 804-1 and the first data tracking signal 806-1 to the output pad 1006. A combination of the first chunk 804-1 and the first data tracking signal 806-1 is represented by test result data 1112.

Depending on an implementation of the shift register 1002, bits associated with the first chunk 804-1 and the first data tracking signal 806-1 can be passed to the output pad 1006 in a variety of different output orders 1016. In some cases, bits associated with the first chunk 804-1 are together passed to the output pad 1006 before or after bits associated with the first data tracking signal 806-1. In other cases, bits associated with the first chunk 804-1 are interleaved with bits associated with the first data tracking signal 806-1. Example output orders 1016 are further described with respect to FIGS. 13-1 and 13-2.

Although aspects of the data-transfer test mode 310 are described with respect to the connected data pin 606 and the data-tracking-signal pin 608 being floating, the interface die 504 can also operate according to the data-transfer test mode 310 in other situations. For example, consider a case in which the interface die 504 is integrated within the interconnected die architecture. In this case, the connected data pin 606 and the data-tracking-signal pin 608 can be connected to a high impedance (e.g., via a switch) based on the data-transfer test request 610 to simulate the interface die 504 being independent (e.g., separate from another interconnected die 120). With the pins 606 and 608 set to high impedance, the interface die 504 can operate according to the data-transfer test mode 310. An example implementation of the shift register 1002 is further described with respect to FIG. 12.

Figure 12:
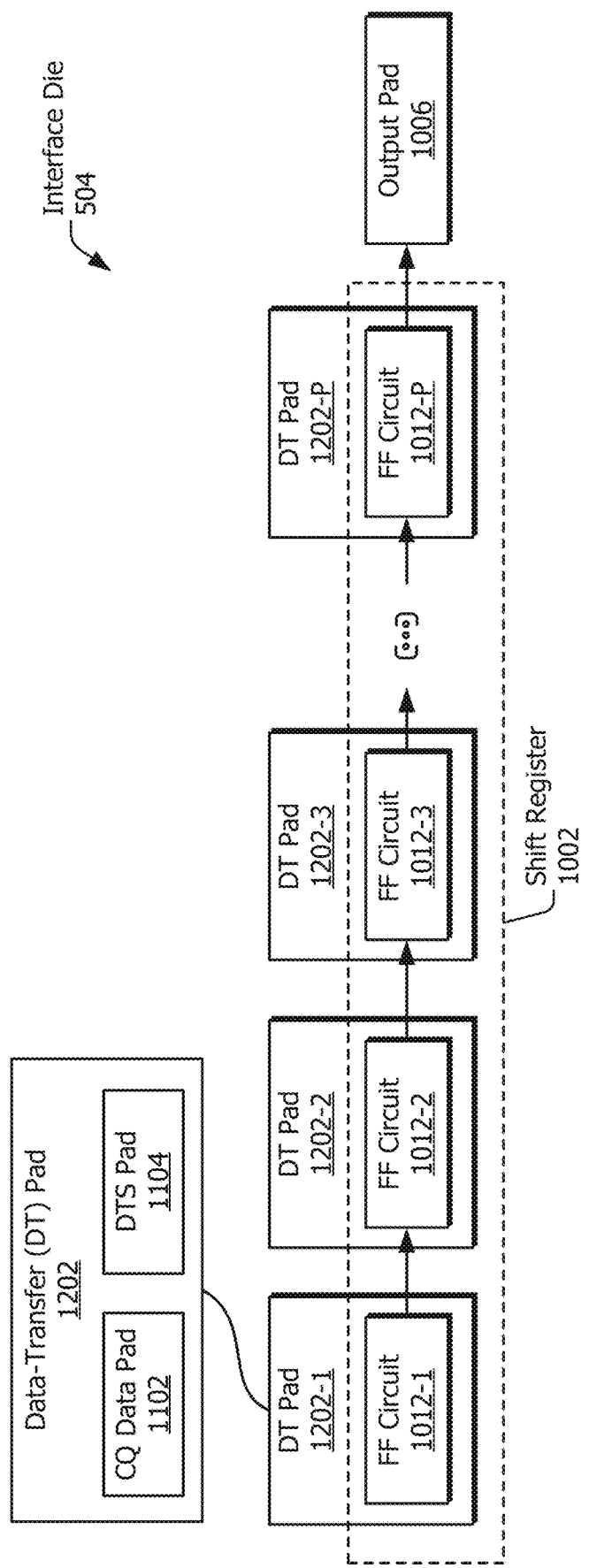
FIG. 12 illustrates an example implementation of a shift register that supports a data-transfer test mode.

FIG. 12 illustrates an example implementation of the shift register 1002 that supports the data-transfer test mode 310. In the depicted configuration, the interface die 504 includes multiple data-transfer (DT) pads 1202 (DT Pad 1202), including data-transfer pads 1202-1, 1202-2, 1202-3 . . . 1202-P. The variable P represents a positive integer. Each data-transfer pad 1202 represents a connected data pad 1102 or a data-tracking-signal pad 1104. In general, the multiple data-tracking pads 1202-1 to 1202-P include at least one connected data pad 1102 and at least one data-tracking-signal pad 1104. The interface die 504 also includes at least one output pad 1006. In general, the quantity of data-transfer pads 1202 (e.g., P) is greater than a quantity of output pads 1006. In this example, the interface die 504 includes one output pad 1006.

The shift register 1002 includes multiple flip-flop circuits 1012, including flip-flop circuits 1012-1, 1012-2, 1012-3 . . . 1012-P, which are coupled together. In this example, one of the flip-flop circuits 1012 (e.g., flip-flop circuit 1012-P) is coupled to the output pad 1006. Also, the flip-flop circuits 1012-1 to 1012-P are shown to be implemented as part of the data-transfer pads 1202-1 to 1202-P, respectively. For example, the data-transfer pad 1202-1 includes the flip-flop circuit 1012-1, and the data-transfer pad 1202-P includes the flip-flop circuit 1012-P. In this manner, components of the shift register 1002 are distributed across the data-transfer pads 1202-1 to 1202-P.

Consider an example in which the quantity of data-transfer pads 1202 is at least two and the quantity of output pads 1006 is one. In this case, the shift register 1002 can be implemented as the parallel-in serial-out shift register 1014. During operation, the shift register 1002 loads data from the data-transfer pads 1202-1 to 1202-P into the flip-flop circuits 1012-1 to 1012-P. Next, the shift register 1002 shifts the data across the flip-flop circuits 1012-1 to 1012-P to the output pad 1006. In particular, the data present at the data-transfer pad 1202-1 is shifted from the flip-flop circuit 1012-1 to the flip-flop circuit 1012-2. The data present at the data-transfer pad 1202-2 is shifted from the flip-flop circuit 1012-2 to the flip-flop circuit 1012-3. The data present at the data-transfer pad 1202-P is shifted from the flip-flop circuit 1012-P to the output pad 1006. In some implementations, an order in which the data is transferred from the data-transfer pads 1202-1 to 1202-P to the output pad 1006 can be based at least in part on the differences in positions of the data-transfer pads relative to the output pad 1006, as further described with respect to FIGS. 13-1 and 13-2.

Figures 1, 13:
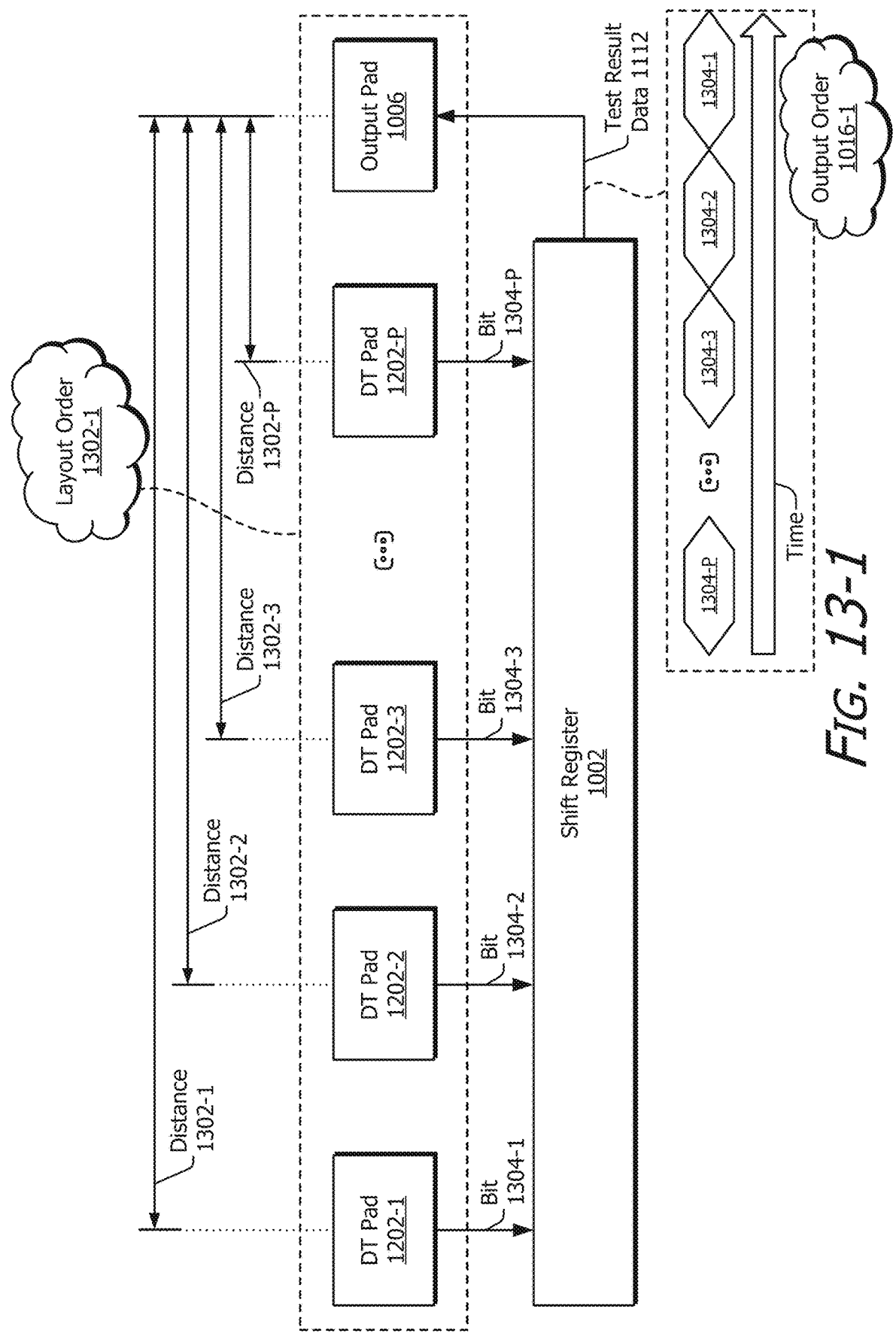
Figures 2, 13:
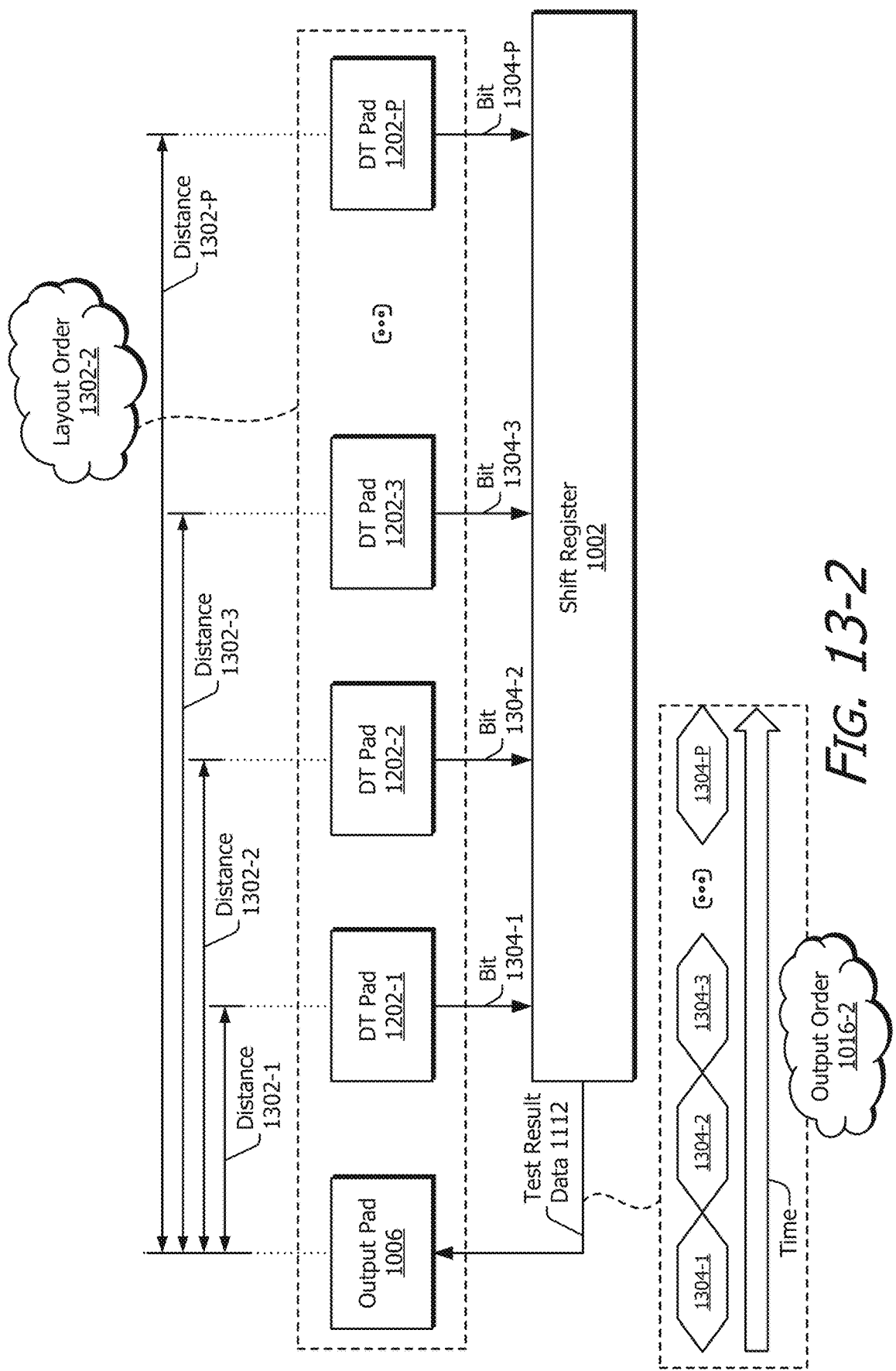

FIG. 13-1 illustrates an example output order 1016-1 in accordance with the data-transfer test mode 310. In this example, the output order 1016-1 is based on a layout order 1302-1 of the data-transfer pads 1202-1 to 1202-P. The layout order 1302-1 represents an order in which the data-transfer pads 1202 are positioned with respect to the output pad 1006. In the depicted configuration, the data-transfer pads 1202-1 to 1202-P are respectively positioned at distances 1302-1 to 1302-P from the output pad 1006. In this example, the distances 1302-1 to 1302-P are in a descending order such that the distance 1302-1 represents the longest distance 1302 and the distance 1302-P represents the shortest distance.

During the data-transfer test mode 310, the shift register 1002 accepts bits 1304-1 to 1304-P from the data-transfer pads 1202-1 to 1202-P, respectively. The bits 1304-1 to 1304-P represent the test result data 1112. The shift register 1002 passes the test result data 1112 to the output pad 1006 with the bits 1304-1 to 1304-P arranged in a particular output order 1016-1, which is further described below.

In this example, the output order 1016-1 is based on the positions of the data-transfer pads 1202 relative to the output pad 1006. For example, the output order 1016-1 corresponds to an ascending order of distances 1302 between the data-transfer pads 1202-1 to 1202-P and the output pad 1006. For example, the shift register 1002 first passes the bit 1304-P of the test results data 1112 to the output pad 1006 as the bit 1304-P corresponds with a data-transfer pad 1202 (e.g., data-transfer pad 1202-P) that is a shortest distance 1302 (e.g., distance 1302-P) from the output pad 1006. On a next cycle of the clock signal 1108, the shift register 1002 passes the bit 1304 corresponding to the data-transfer pad 1202 that has the next shortest distance 1302 to the output pad 1006. In this example, the following bit is the bit 1304-3 corresponding to the data-transfer pad 1202-3, which is a distance 1302-3 from the output pad 1006. Following the bit 1304-3, the test result data 1112 can include the bit 1304-2, which precedes the bit 1304-1.

In this example implementation, the data-transfer pads 1202-1 to 1202-P are on a "left side" of the output pad 1006. In this manner, the shift register 1002 performs a shift operation that shifts the bits 1304-1 to 1304-P sequentially to the "right" (e.g., towards the output pad 1006). In another example implementation, the data-transfer pads 1202-1 to 1202-P are on a "right side" of the output pad 1006, as further described with respect to FIG. 13-2.

FIG. 13-2 illustrates another example output order 1016-2 in accordance with the data-transfer test mode 310. Similar to the output order 1016-1 of FIG. 13-1, the output order 1016-2 of FIG. 13-2 is based on a layout order 1302-2 of the data-transfer pads 1202-1 to 1202-P. In particular, the output order 1016-2 is based on the positions of the data-transfer pads 1202 relative to the output pad 1006. For example, the output order 1016-1 corresponds to an ascending order of distances 1302 between the data-transfer pads 1202-1 to 1202-P and the output pad 1006. In contrast to the distances 1302-1 to 1302-P of FIG. 13-1, the distances 1302-1 to 1302-P of FIG. 13-2 are in an ascending order such that the distance 1302-1 represents the shortest distance 1302 and the distance 1302-P represents the longest distance.

In the depicted configuration, the data transfer pads 1202-1 to 1202-P are positioned on a "right side" of the output pad 1006. As such, the shift register 1002 performs a shift operation that shifts the bits 1304-1 to 1304-P sequentially to the "left" (e.g., towards the output pad 1006). In particular, the shift register 1002 first passes the bit 1304-1 of the test result data 1112 to the output pad 1006 as the bit 1304-1 corresponds with the data-transfer pad 1202 (e.g., data-transfer pad 1202-1) that is a shortest distance 1302 (e.g., distance 1302-1) from the output pad 1006. On a next cycle of the clock signal 1108, the shift register 1002 passes the bit 1304 corresponding to the data-transfer pad 1202 that has the next shortest distance 1302 to the output pad 1006. In this example, the following bit is the bit 1304-2 corresponding to the data-transfer pad 1202-2, which is a distance 1302-2 from the output pad 1006. Following the bit 1304-2, the test result data 1112 can include the bit 1304-3, which precedes the bit 1304-P.

Example Methods

Figure 14:
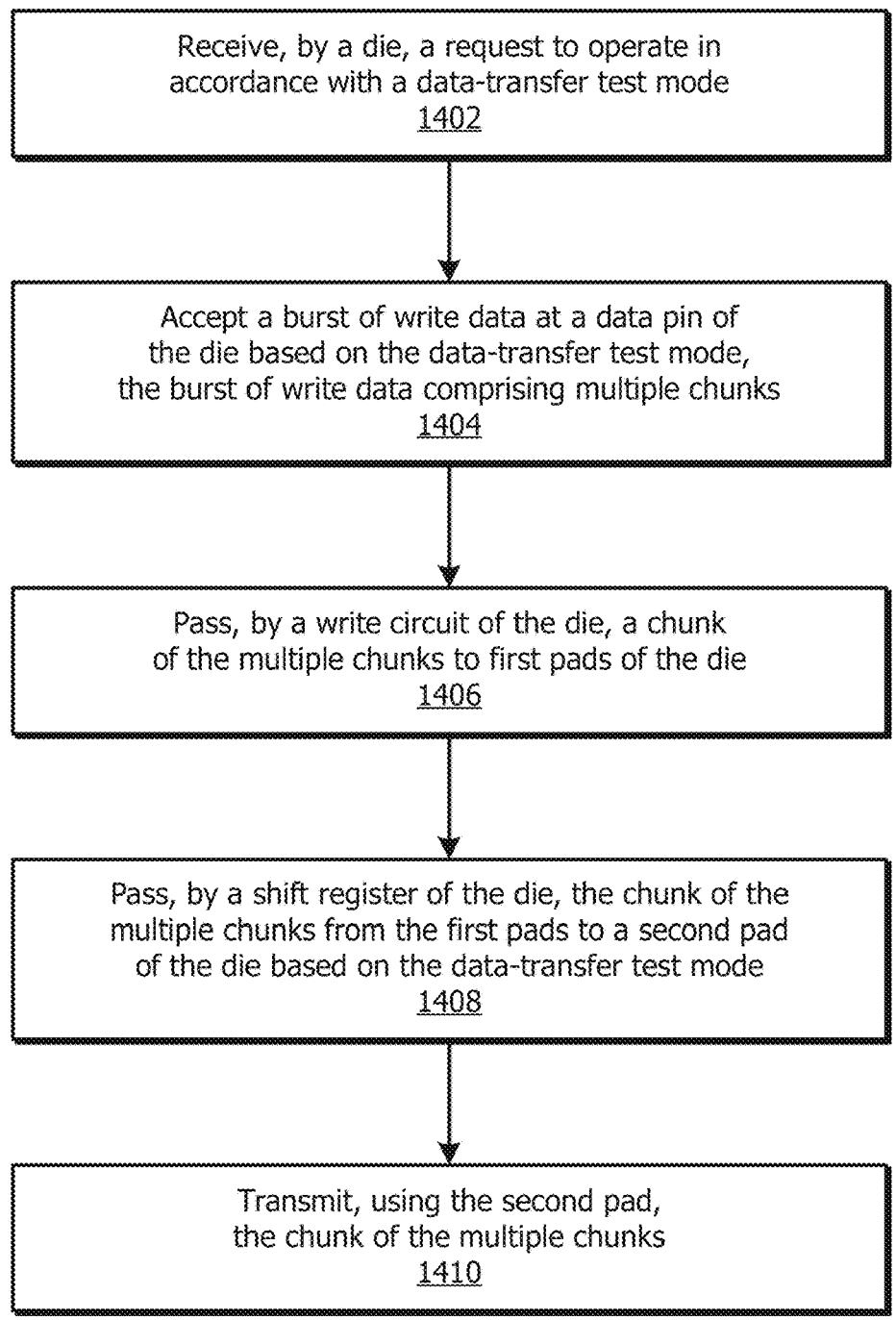
FIG. 14 illustrates an example method for implementing aspects of a data-transfer test mode.
Figure 15:
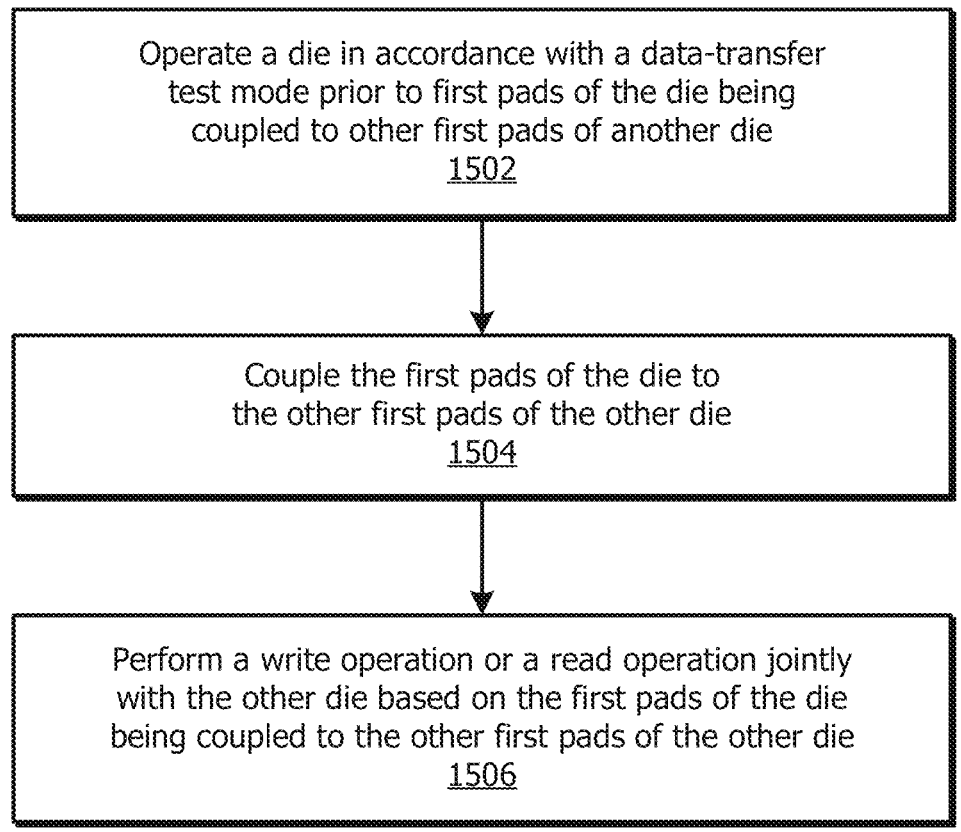
FIG. 15 illustrates another example method for implementing aspects of a data-transfer test mode.

This section describes example methods for implementing a data-transfer test mode with reference to the flow charts and flow diagrams of FIGS. 14 and 15. These descriptions may also refer to components, entities, and other aspects depicted in FIGS. 1 to 13-2 by way of example only. The described methods are not necessarily limited to performance by one entity or multiple entities operating on one device.

FIG. 14 illustrates a flow diagram 1400, which includes operations 1402 through 1410. These operations can be performed by a die 304 to implement aspects of a data-transfer test mode 310. At 1402, a die receives a request to operate in accordance with a data-transfer test mode. For example, the die 304 receives the data-transfer test request 610, which causes the die 304 to operate in accordance with the data-transfer test mode 310. The die 304 can be implemented on a wafer or a single die package, or integrated with an interconnected die architecture. The die 304 can be configured as an interface die 504.

At 1404, the die accepts a burst of write data at a data pin of the die based on the data-transfer test mode. The burst of write data comprises multiple chunks. For example, the die 304 accepts the burst of write data 802 at the data pin 604 based on the data-transfer test mode 310, as shown in FIG. 11. The burst of write data 802 includes multiple chunks 804, such as chunks 804-1 and 804-2.

At 1406, a write circuit of the die passes a chunk of the multiple chunks to first pads of the die. For example, the write circuit 702 passes the chunk 804-1 to data-transfer pads 1202, as shown in FIG. 11. The data-transfer pads 1202 can include at least one connected data pad 1102 and at least one data-tracking-signal pad 1104, as shown in FIG. 12.

At 1408, a shift register of the die passes the chunk of the multiple chunks from the first pads to a second pad of the die based on the data-transfer test mode. For example, the shift register 1002 passes the chunk 804-1 from the data-transfer pads 1202 to the output pad 1006 based on the data-transfer test mode 310, as shown in FIG. 12. The shift register 1002 can also pass the data tracking signal 806-1 from the data-transfer pads 1202 to the output pad 1006 based on the data-transfer test mode 310. An order in which bits of the chunk 804-1 (and optionally the data tracking signal 806-1) are passed to the output pad 1006 can depend on an implementation of the shift register 1002. In some implementations, the shift register 1002 passes the bits in an order that corresponds to positions of the data-transfer pads 1202 relative to the output pad 1006, as shown in FIGS. 13-1 and 13-2.

At 1410, the die transmits the chunk of the multiple chunks using the second pad. For example, the die 304 transmits the chunk 804-1 using the output pad 1006. In this way, the chunk 804-1 (and optionally the data tracking signal 806-1) can be transmitted to an external entity for evaluation, such as a test engine or a test engineer.

FIG. 15 illustrates a flow diagram 1500, which includes operations 1502 through 1506. These operations can be performed by a die 304 to implement aspects of a data-transfer test mode 310. At 1502, the die 304 operates in accordance with a data-transfer test mode prior to first pads of the die being coupled to other first pads of another die. For example, the die 304 operates in accordance with the data-transfer test mode 310 prior to the data-transfer pads 1202 of the die 304 being coupled to other data-transfer pads 1202 of another die 304, as shown in FIG. 11. The die 304 can represent an interface die 504, and the other die 304 can represent a linked die 506. In some cases, the die 304 is not coupled to the other die because the die 304 is implemented on a wafer or a single die package and has yet to be integrated within the interconnected die architecture.

At 1504, the first pads of the die are coupled to the other first pads of the other die. For example, the data-transfer pads 1202 (e.g., the connected data pin 606 and the data-tacking-signal pin 608) of the die 304 are coupled to the other data-transfer pads 1202 of the other die 304. With this coupling, the die 304 is integrated within the interconnected die architecture.

At 1506, the die 304 performs a write operation or a read operation jointly with the other die based on the first pads being coupled to the other first pads of the other die. For example, the die 304 performs the write operation 312 or the read operation 314 jointly with the other die 304 based on the data-transfer pads 1202 of the die 304 being coupled to the other data-transfer pads 1202 of the other die 304, as shown in FIGS. 8-1 to 8-2. Explained another way, the die 304 operates in accordance with the interconnected mode 308.

Aspects of these methods or operations may be implemented in, for example, hardware (e.g., fixed-logic circuitry or a processor in conjunction with a memory), firmware, or some combination thereof. The methods may be realized using one or more of the apparatuses, systems, or components shown in FIGS. 1-6, the components of which may be further divided, combined, rearranged, and so on. The devices, systems, and components of these figures generally represent firmware, such as executable-code or the actions thereof; hardware, such as electronic devices, packaged modules, IC chips, or circuits; software, such as processorexecutable instructions; or a combination thereof. The illustrated apparatuses 102 and components of 200, include, for instance, a memory controller 114, an interconnect 106, and a memory device 108. FIGS. 1-6 illustrate some of the many possible systems or apparatuses capable of implementing the described methods.

Computer-readable media includes both non-transitory computer storage media and communication media including any medium that facilitates transfer of a computer program (e.g., an application) or data from one entity to another. Non-transitory computer storage media can be any available medium accessible by a computer, such as RAM, ROM, Flash, EEPROM, optical media, and magnetic media.

In the following, various examples for implementing aspects of a data-transfer test mode are described:

Example 1: An apparatus comprising:
a die comprising:
a data pin configured to accept a burst of write data;
first pads;
a second pad;
a write circuit coupled to the data pin and the first pads, the write circuit configured to pass a chunk of the burst of write data to the first pads; and
data-transfer test-mode circuitry coupled to the first pads and the second pad, the data-transfer test-mode circuitry configured to selectively:
be in a disabled state in accordance with an interconnected mode;
responsive to being in the disabled state, enable the chunk of the burst of write data to pass from the first pads to another die that is coupled to the first pads;
be in an enabled state in accordance with a data-transfer test mode; and
responsive to being in the enabled state, pass the chunk of the burst of write data from the first pads to the second pad.

Example 2: The apparatus of example 1 or any other example, wherein the first pads are configured to be disconnected from the other die during the data-transfer test mode.

Example 3: The apparatus of example 2 or any other example, wherein:
the die is implemented on a wafer or a single-die-package during the data-transfer test mode; and
the die is integrated within an interconnected die architecture during the interconnected mode.

Example 4: The apparatus of example 1 or any other example, wherein:
the first pads comprise a first quantity of pads;
the second pad comprises a second quantity of pads; and
the first quantity of pads is greater than the second quantity of pads.

Example 5: The apparatus of example 4 or any other example, wherein the second quantity of pads is equal to one.

Example 6: The apparatus of example 1 or any other example, wherein the second pad is configured to transmit the chunk of the burst of write data during the data-transfer test mode.

Example 7: The apparatus of example 1 or any other example, wherein the data-transfer test-mode circuitry comprises a shift register coupled between the first pads and the second pad.

Example 8: The apparatus of example 7 or any other example, wherein:
the die comprises:
a third pad configured to accept a clock signal during the data-transfer test mode; and
a fourth pad configured to accept a clock-enable signal during the data-transfer test mode; and
the shift register is coupled to the third pad and the fourth pad and is configured to pass bits associated with the chunk of the burst of write data from the first pads to the second pad based on the clock signal and the clock-enable signal.

Example 9: The apparatus of example 8 or any other example, wherein:
the third pad comprises a third pin;
the fourth pad comprises a fourth pin; and
the third and fourth pins each comprise a command-and-address pin.

Example 10: The apparatus of example 9 or any other example, wherein:
the die further comprises multiple command-and-address pins; and
the third and fourth pins represent two command-and-address pins of the multiple command-and-address pins that are positioned proximate to the shift register compared to other command-and-address pins of the multiple command-and-address pins.

Example 11: The apparatus of example 7 or any other example, wherein:
the shift register comprises multiple flip-flop circuits; and
each of the first pads comprises one flip-flop circuit of the multiple flip-flop circuits.

Example 12: The apparatus of example 7 or any other example, wherein:
the first pads comprise multiple first pins;
the second pad comprises a second pin; and
the shift register comprises a parallel-input serial-output shift register coupled between the multiple first pins and the second pin.

Example 13: The apparatus of example 12 or any other example, wherein the second pin comprises a termination data pin of the die.

Example 14: The apparatus of example 12 or any other example, wherein:
the first pads are configured to accept respective bits of the chunk of the burst of write data; and
the data-transfer test-mode circuitry is configured to pass the bits of the chunk of the burst of write data to the second pad in an order associated with positions of the first pads relative to the second pad.

Example 15: The apparatus of example 14 or any other example, wherein the order corresponds to an ascending order of distances between the first pads and the second pad.

Example 16: The apparatus of example 15 or any other example, wherein:
one of the first pads is positioned at a first distance from the second pad and is configured to pass a first bit of the chunk of the burst of write data to the data-transfer test-mode circuitry;
another one of the first pads is positioned at a second distance from the second pad and is configured to pass a second bit of the chunk of the burst of write data to the data-transfer test-mode circuitry, the second distance being greater than the first distance; and
the data-transfer test-mode circuitry is configured to pass the first bit to the second pad prior to passing the second bit to the second pad.

Example 17: The apparatus of example 1 or any other example, wherein:

the first pads comprise at least one connected data pad and at least one data-tracking-signal pad;

the at least one connected data pad is configured to accept the chunk of the burst of write data;

the at least one data-tracking-signal pad is configured to accept a data tracking signal associated with the chunk of the burst of write data; and the data-transfer test-mode circuitry is configured to pass the chunk of the burst of write data and the data tracking signal to the second pad.

Example 18: The apparatus of example 1 or any other example, wherein:

the die further comprises a memory array; and the write circuit is configured to:

pass the chunk of the burst of write data to the first pads in accordance with the interconnected mode and the data-transfer test mode; and pass another chunk of the burst of write data to the memory array in accordance with at least the interconnected mode.

Example 19: The apparatus of example 1 or any other example, wherein:

the data pin is configured to be coupled to a memory controller in accordance with the interconnected mode;

the apparatus comprises a Compute Express Link® (CXL®) device; and the memory controller is coupled to the die via an interconnect that is internal to the CXL device.

Example 20: A method comprising:

receiving, by a die, a request to operate in accordance with a data-transfer test mode;

accepting a burst of write data at a data pin of the die based on the data-transfer test mode, the burst of write data comprising multiple chunks;

passing, by a write circuit of the die, a chunk of the multiple chunks to first pads of the die;

passing, by a shift register of the die, the chunk of the multiple chunks from the first pads to a second pad of the die based on the data-transfer test mode; and transmitting, using the second pad, the chunk of the multiple chunks.

Example 21: The method of example 20 or any other example, wherein the receiving of the request, the accepting of the burst of write data, the passing of the chunk to the first pads, the passing of the chunk to the second pad, and the transmitting of the chunk is independent of the first pads being connected to or disconnected from other first pads of another die.

Example 22: The method of example 20 or any other example, further comprising:

accepting, by the shift register, a clock signal from a third pad of the die; and accepting, by the shift register, a clock-enable signal from a fourth pad of the die, wherein the passing the chunk of the multiple chunks from the first pads to the second pad comprises passing the chunk of the multiple chunks from the first pads to the second pad based on the clock signal and the clock-enable signal.

Example 23: The method of example 20 or any other example, wherein the passing the chunk of the multiple chunks from the first pads to the second pad comprises passing bits associated with the chunk of the multiple chunks from the first pads to the second pad in an order associated with positions of the first pads relative to the second pad.

Example 24: The method of example 23 or any other example, wherein the order of the bits associated with the chunk of the multiple chunks corresponds to an ascending order of distances between the corresponding first pads and the second pad.

Example 25: The method of example 23 or any other example, further comprising:

generating, by the write circuit, a data tracking signal associated with the chunk of the multiple chunks, wherein the order causes a bit associated with the data tracking signal to be transmitted between two bits associated with the chunk of the multiple chunks.

Example 26: The method of example 20 or any other example, further comprising writing another chunk of the multiple chunks to a memory array of the die based on the data-transfer test mode.

Example 27: An apparatus comprising:

a die comprising:

a data pin;

first pads comprising first pins configured to be:

floating; or coupled to other first pins of another die;

a second pad;

a write circuit coupled between the data pin and the first pads; and a shift register coupled between the first pads and the second pad.

Example 28: The apparatus of example 27 or any other example, wherein:

the shift register comprises multiple flip-flop circuits; and each of the first pads comprises one flip-flop circuit of the multiple flip-flop circuits.

Example 29: The apparatus of example 27 or any other example, wherein the shift register comprises a parallel-in serial-out shift register.

Example 30: The apparatus of example 27 or any other example, wherein:

the die comprises:

a third pad configured to accept a clock signal in accordance with a data-transfer test mode; and a fourth pad configured to accept a clock-enable signal in accordance with the data-transfer test mode;

the data pin is configured to accept a burst of write data;

the write circuit is configured to:

generate a data tracking signal associated with a chunk of the burst of write data; and pass the chunk of the burst of write data and the data tracking signal to the first pads; and the shift register is configured to pass the chunk of the burst of write data and the data tracking signal to the second pad based on the clock signal and the clock-enable signal.

Example 31: The apparatus of example 30 or any other example, wherein:

the second pad comprises a termination data pin of the die;

the third pad comprises a command-and-address pin of the die; and the fourth pad comprises another command-and-address pin of the die.

Example 32: The apparatus of example 30 or any other example, wherein:

the first pads are positioned at different distances from the second pad;

each of the first pads is configured to a bit associated with the chunk of the burst of write data or the data tracking signal; and the shift register is configured to pass the bits of the chunk of the burst of write data and the data tracking signal in an order that corresponds to an ascending order of distances between the first pads and the second pad.

Example 33: An apparatus comprising:
a die comprising:
first pads; and
a second pad,
the die configured to:
be one of multiple dies that are interconnected using the first pads during an interconnected mode; and
prior to being connected to another die of the multiple dies:
operate in accordance with a data-transfer test mode; and
responsive to operating in accordance with the data-transfer test mode, transmit, using a second pad of the die, a chunk of a burst of write data intended to be transferred to the other die using the first pads in accordance with the interconnected mode.

Example 34: The apparatus of example 33 or any other example, wherein the apparatus comprises a wafer or a single die package.

Example 35: The apparatus of example 33 or any other example, wherein:
the first pads are positioned at different distances from the second pad;
the first pads are configured to accept respective bits of the chunk of the burst of write data; and
the die is configured to transmit the bits of the chunk of the burst of write data in an order that corresponds to an ascending order of distances between the first pads and the second pad.

Example 36: A method comprising:
operating a die in accordance with a data-transfer test mode prior to first pads of the die being coupled to other first pads of another die;
coupling the first pads of the die to the other first pads of the other die; and
performing a write operation or a read operation jointly with the other die based on the first pads of the die being coupled to the other first pads of the other die.

Example 37: The method of example 36 or any other example, wherein the operating the die in accordance with the data-transfer test mode comprises:
receiving, by the die, a request to operate in accordance with the data-transfer test mode;
accepting a burst of write data at a data pin of the die based on the data-transfer test mode, the burst of write data comprising multiple chunks;
passing, by a write circuit of the die, a chunk of the multiple chunks to the first pads of the die;
passing, by a shift register of the die, the chunk of the multiple chunks from the first pads to a second pad of the die based on the data-transfer test mode; and
transmitting, using the second pad, the chunk of the multiple chunks.

Example 38: The method of example 37 or any other example, wherein the transmitting of the chunk of the multiple chunks comprises transmitting bits associated with the chunk of the multiple chunks in an order associated with positions of the first pads relative to the second pad.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although aspects of implementing a data-transfer test mode have been described in language specific to certain features and/or methods, the subject of the appended claims is not necessarily limited to the specific features or methods described. Rather, the specific features and methods are disclosed as a variety of example implementations of implementing a data-transfer test mode.

What is claimed is:

1. An apparatus comprising:
a die comprising:
first pads; and
a second pad,
the die configured to:
be one of multiple dies that are interconnected using the first pads during an interconnected mode; and
prior to being connected to another die of the multiple dies:
operate in accordance with a data-transfer test mode; and
responsive to operating in accordance with the data-transfer test mode, transmit, using a second pad of the die, a chunk of a burst of write data intended to be transferred to the other die using the first pads in accordance with the interconnected mode.

2. The apparatus of claim 1, wherein the apparatus comprises a wafer or a single die package.

3. The apparatus of claim 1, wherein:
the first pads are positioned at different distances from the second pad;
the first pads are configured to accept respective bits of the chunk of the burst of write data; and
the die is configured to transmit the bits of the chunk of the burst of write data in an order that corresponds to an ascending order of distances between the first pads and the second pad.

4. The apparatus of claim 1, wherein the die comprises:
a data pin;
a write circuit coupled between the data pin and the first pads; and
a shift register coupled between the first pads and the second pad.

5. The apparatus of claim 4, wherein:
the shift register comprises multiple flip-flop circuits; and
each of the first pads comprises one flip-flop circuit of the multiple flip-flop circuits.

6. The apparatus of claim 4, wherein the shift register comprises a parallel-in serial-out shift register.

7. The apparatus of claim 4, wherein:
the die comprises:
a third pad configured to accept a clock signal in accordance with the data-transfer test mode; and a fourth pad configured to accept a clock-enable signal in accordance with the data-transfer test mode;

the data pin is configured to accept the burst of write data;

the write circuit is configured to:
generate a data tracking signal associated with the chunk of the burst of write data; and
pass the chunk of the burst of write data and the data tracking signal to the first pads; and the shift register is configured to pass the chunk of the burst of write data and the data tracking signal to the second pad based on the clock signal and the clock-enable signal.

8. The apparatus of claim 7, wherein:
the second pad comprises a termination data pin of the die;
the third pad comprises a command-and-address pin of the die; and
the fourth pad comprises another command-and-address pin of the die.

9. A method comprising:
receiving, by a die, a request to operate in accordance with a data-transfer test mode;
accepting a burst of write data at a data pin of the die based on the data-transfer test mode, the burst of write data comprising multiple chunks;
passing, by a write circuit of the die, a chunk of the multiple chunks to first pads of the die;
passing, by a shift register of the die, the chunk of the multiple chunks from the first pads to a second pad of the die based on the data-transfer test mode; and
transmitting, using the second pad, the chunk of the multiple chunks.

10. The method of claim 9, wherein the receiving of the request, the accepting of the burst of write data, the passing of the chunk to the first pads, the passing of the chunk to the second pad, and the transmitting of the chunk is independent of the first pads being connected to or disconnected from other first pads of another die.

11. The method of claim 9, further comprising:
accepting, by the shift register, a clock signal from a third pad of the die; and
accepting, by the shift register, a clock-enable signal from a fourth pad of the die,
wherein the passing the chunk of the multiple chunks from the first pads to the second pad comprises passing the chunk of the multiple chunks from the first pads to the second pad based on the clock signal and the clock-enable signal.

12. The method of claim 9, wherein the passing the chunk of the multiple chunks from the first pads to the second pad comprises passing bits associated with the chunk of the multiple chunks from the first pads to the second pad in an order associated with positions of the first pads relative to the second pad.

13. The method of claim 12, wherein the order of the bits associated with the chunk of the multiple chunks corresponds to an ascending order of distances between the corresponding first pads and the second pad.

14. The method of claim 12, further comprising:
generating, by the write circuit, a data tracking signal associated with the chunk of the multiple chunks,
wherein the order causes a bit associated with the data tracking signal to be transmitted between two bits associated with the chunk of the multiple chunks.

15. An apparatus comprising:
a die comprising:
a data pin configured to accept a burst of write data;
first pads;
a second pad;
a write circuit coupled to the data pin and the first pads, the write circuit configured to pass a chunk of the burst of write data to the first pads; and
data-transfer test-mode circuitry coupled to the first pads and the second pad, the data-transfer test-mode circuitry configured to selectively:
be in a disabled state in accordance with an interconnected mode;
responsive to being in the disabled state, enable the chunk of the burst of write data to pass from the first pads to another die that is coupled to the first pads;
be in an enabled state in accordance with a data-transfer test mode; and
responsive to being in the enabled state, pass the chunk of the burst of write data from the first pads to the second pad.

16. The apparatus of claim 15, wherein the first pads are configured to be disconnected from the other die during the data-transfer test mode.

17. The apparatus of claim 16, wherein:
the die is implemented on a wafer or a single-die-package during the data-transfer test mode; and
the die is integrated within an interconnected die architecture during the interconnected mode.

18. The apparatus of claim 15, wherein:
the first pads comprise a first quantity of pads;
the second pad comprises a second quantity of pads; and
the first quantity of pads is greater than the second quantity of pads.

19. The apparatus of claim 15, wherein:
the first pads are configured to accept respective bits of the chunk of the burst of write data; and
the data-transfer test-mode circuitry is configured to pass the bits of the chunk of the burst of write data to the second pad in an order associated with positions of the first pads relative to the second pad.

20. The apparatus of claim 15, wherein:
the data pin is configured to be coupled to a memory controller in accordance with the interconnected mode;
the apparatus comprises a Compute Express Link® (CXL®) device; and
the memory controller is coupled to the die via an interconnect that is internal to the CXL device.

* * * * *